United States Patent
Zhao

(10) Patent No.: US 11,825,467 B2
(45) Date of Patent: Nov. 21, 2023

(54) UPLINK TRANSMISSION METHOD AND APPARATUS

(71) Applicant: BEIJING XIAOMI MOBILE SOFTWARE CO., LTD., Beijing (CN)

(72) Inventor: Qun Zhao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 18 days.

(21) Appl. No.: 17/076,725

(22) Filed: Oct. 21, 2020

(65) Prior Publication Data

US 2021/0058948 A1 Feb. 25, 2021

Related U.S. Application Data

(63) Continuation of application No. PCT/CN2018/085090, filed on Apr. 28, 2018.

(51) Int. Cl.
*H04W 72/12* (2009.01)
*H04B 7/06* (2006.01)
(Continued)

(52) U.S. Cl.
CPC ...... *H04W 72/1268* (2013.01); *H04B 7/0626* (2013.01); *H04L 1/0004* (2013.01); *H04L 1/1819* (2013.01); *H04W 72/0413* (2013.01); *H04W 72/0446* (2013.01); *H04W 72/0453* (2013.01); *H04W 72/1284* (2013.01)

(58) Field of Classification Search
None
See application file for complete search history.

(56) References Cited

U.S. PATENT DOCUMENTS 8,422,429 B2   4/2013   Nam et al.
9,125,191 B2   9/2015   Papasakellariou et al.
(Continued)

FOREIGN PATENT DOCUMENTS

CN   101883391 A   11/2010
CN   102301792 A   12/2011
(Continued)

OTHER PUBLICATIONS

R1-1801262 Ericsson "Summary of Discussions on Multiplexing Different UCI types on a PUCCH resource" 3GPP WG1 AH 1801 Vancouver Jan. 22-26, 2018 (Year: 2018).*
(Continued)

*Primary Examiner* — Basil Ma
(74) *Attorney, Agent, or Firm* — Arch & Lake LLP

(57) ABSTRACT

Provided are an uplink transmission method and apparatus. The UE determines a time-domain overlapping channel group to be transmitted in a time unit, where the time-domain overlapping channel group includes a group of PUCCHs and a group of PUSCHs. The group of PUCCHs and the group of PUSCHs include a PUCCH and a PUSCH that overlap in time domain, where the PUCCH included in the group of PUCCHs is configured to transmit an uplink SR and the PUSCH included in the group of PUSCHs is configured to transmit uplink data. The UE performs multiplexing transmission on UCI and uplink data to be transmitted by the time-domain overlapping channel group, where the UCI includes the uplink SR.

6 Claims, 32 Drawing Sheets

(51) Int. Cl.
  *H04L 1/00* (2006.01)
  *H04L 1/18* (2006.01)
  *H04W 72/04* (2009.01)
  *H04W 72/1268* (2023.01)
  *H04L 1/1812* (2023.01)
  *H04W 72/0446* (2023.01)
  *H04W 72/0453* (2023.01)

(56) References Cited

U.S. PATENT DOCUMENTS

| | | | |
|---|---|---|---|
| 9,253,765 | B2 | 2/2016 | Nam et al. |
| 9,408,198 | B2 | 8/2016 | Papasakellariou et al. |
| 9,655,091 | B2 | 5/2017 | Papasakellariou et al. |
| 2010/0195575 | A1 | 8/2010 | Papasakellariou et al. |
| 2011/0274043 | A1 | 11/2011 | Nam et al. |
| 2013/0230004 | A1 | 9/2013 | Nam et al. |
| 2014/0177572 | A1 | 6/2014 | Papasakellariou et al. |
| 2016/0021653 | A1 | 1/2016 | Papasakellariou et al. |
| 2016/0094996 | A1* | 3/2016 | Xiong ............... H04W 72/0446 370/329 |
| 2016/0242166 | A1 | 8/2016 | Nam et al. |
| 2017/0265181 | A1 | 9/2017 | Patel et al. |
| 2018/0084540 | A1 | 3/2018 | Takeda et al. |
| 2019/0320431 | A1* | 10/2019 | Huang ............... H04L 5/0064 |
| 2020/0008158 | A1* | 1/2020 | Yamamoto ......... H04W 52/146 |

FOREIGN PATENT DOCUMENTS

| | | |
|---|---|---|
| CN | 103580816 A | 2/2014 |
| CN | 104539396 A | 4/2015 |
| CN | 106900071 A | 6/2017 |
| CN | 106961744 A | 7/2017 |
| CN | 107432013 A | 12/2017 |
| EP | 3379753 A1 | 9/2018 |
| JP | 2016506199 A | 2/2016 |
| RU | 2015132721 A | 11/2015 |
| WO | 2016159231 A1 | 10/2016 |

OTHER PUBLICATIONS

R1-1802510 Panasonic "Discussion on partial overlap between HARQ-ACK and SR" 3GPP WG1 #92 Athens Feb. 26-Mar. 2, 2018 (Year: 2018).*

R1-1802692 Huawei "Transmission of PUCCH and PUSCH with partial overlap" 3GPP WG1 #92 Athens Feb. 2018 (Year: 2018).*

Extended European Search Report in the European Application No. 18916658.0 dated Mar. 12, 2021, (8p).

LG Electronics, "UCI Transmission for Simultaneous PUCCH/PUSCH Configuration", Discussion and Decision, 3GPP TSG RAN WG1 Meeting #64, R1-110847, Taipei, Taiwan, Feb. 21-25, 2011, (4p).

Huawei, et al., "Transmission of PUCCH and PUSCH with Partial Overlap", 3GPP TSG RAN WG1 Meeting #92, Athens, Greece, Feb. 26-Mar. 2, 2018, (3p).

Notice of Allowance of the Russian Application No. 2020138489 dated Apr. 7, 2021, (21p).

International Search Report and Written Opinion in the International Application No. PCT/CN2018/085090, dated Dec. 18, 2018, (8p).

First Office Action of the Chinese Application No. 201880000507.3, dated Oct. 12, 2020 with English translation (13p).

"3rd Generation Partnership Project; Technical Specification Group Radio Access Network; NR; Physical channels and modulation (Release 15)" 3GPP TS 38.211 V15.1.0 (Mar. 2018), http://www.3gpp.org (87p).

"3rd Generation Partnership Project; Technical Specification Group Radio Access Network; NR; Multiplexing and channel coding (Release 15)", 3GPP TS 38.212 V15.1.0 (Mar. 2018), http://www.3gpp.org. (90p).

"3rd Generation Partnership Project; Technical Specification Group Radio Access Network; NR; Physical layer procedures for control (Release 15)", 3GPP TS 38.213 V15.1.0 (Mar. 2018), http://www.3gpp.org. (77p).

Huawei, HiSilicon, "Remaining issues on UCI multiplexing"[online], 3GPP TSG RAN WG1 #92b R1-1803646 Internet<URL:http://www.3gpp.org/ftp/tsg_ran/WG1_RL1/TSGR1_92b/Docs/R1-1803646.zip>, Apr. 14-16, 2018, (6p).

OPPO, "Remaining details on UCI multiplexing" [online], 3GPP TSG RAN WG1 #92b R1-1804007,Internet<URL:http://www.3gpp.org/ftp/tsg_ran/WG1_RL1/TSGR1_92 b/Docs/R1-1804007.zip>, Apr. 14-16, 2018,(3p).

First Office Action of the Japanese application No. 2020-557214, dated Dec. 14, 2021,(8p).

First Office Action of the Korean Application No. 10-2020-7032656, dated Apr. 13, 2022, (10p).

NTT Docomo, Inc., "UCI on PUSCH", 3GPP TSG RAN WG1, Meeting #90, R1-1713945, Prague, Czechia, Aug. 21-25, 2017, (7p).

Written Decision on Registration of Korean Application No. 10-2020-7032656 dated Oct. 17, 2022 with English translation, (5p).

Lenovo, et al., "On multiplexing between UCIs and between PUCCH and PUSCH" 3GPP TSG RAN WG1 Meeting #92 R1-1801817, Athens, Greece, Feb. 26-Mar. 2, 2018, (5p).

Intel Corporation, "PUSCH-PUCCH and PUCCH-PUCCH Collision Handling" 3GPP TSG RAN WG1 Meeting #92bis R1-1804729, Sanya, China, Apr. 16-20, 2018, (7p).

\* cited by examiner

UPLINK TRANSMISSION METHOD AND APPARATUS

CROSS-REFERENCE TO RELATED APPLICATION

This application is a continuation of International Patent Application No. PCT/CN2018/085090 filed on Apr. 28, 2018, the entire content of which is incorporated herein by reference for all purposes.

TECHNICAL FIELD

The present disclosure generally relates to the technical field of communication, and particularly, to an uplink transmission method and apparatus.

BACKGROUND

Emerged new-generation novel Internet applications make higher requirements on wireless communication technologies and urge the wireless communication technologies to be evolved to meet the requirements of the applications. At present, a cellular mobile communication technology is in an evolution stage of a new-generation technology. In a new-generation mobile communication system, how to design better uplink transmission to satisfy a requirement of the system is an important subject.

SUMMARY

Embodiments of the present disclosure provide an uplink transmission method and apparatus. The technical solutions are implemented as follows.

According to a first aspect of the present disclosure, an uplink transmission method is provided, which may include that:

a time-domain overlapping channel group to be transmitted in a time unit is determined, where the time-domain overlapping channel group includes a group of Physical Uplink Control Channels (PUCCHs) and a group of Physical Uplink Shared Channels (PUSCHs), the group of PUCCHs and the group of PUSCHs include a PUCCH and a PUSCH that overlap in a time domain, the PUCCH included in the group of PUCCHs is configured to transmit an uplink Scheduling Request (SR) and the PUSCH included in the group of PUSCHs is configured to transmit uplink data; and multiplexing transmission is performed on Uplink Control Information (UCI) and uplink data to be transmitted by the time-domain overlapping channel group, the UCI including the uplink SR.

According to a second aspect of the present disclosure, an uplink transmission method is provided, which includes that:

a PUSCH is received, or the PUSCH and a PUCCH are received; and parsing is performed to obtain UCI and uplink data subjected to multiplexing transmission through the PUSCH or through the PUSCH and the PUCCH, the UCI including an uplink SR.

According to a third aspect of the present disclosure, an uplink transmission apparatus may include:

a determination module, configured to determine a time-domain overlapping channel group to be transmitted in a time unit, where the time-domain overlapping channel group includes a group of PUCCHs and a group of PUSCHs, the group of PUCCHs and the group of PUSCHs include a PUCCH and a PUSCH that overlap in a time domain, the PUCCH included in the group of PUCCHs is configured to transmit an uplink SR and the PUSCH included in the group of PUSCHs is configured to transmit uplink data; and a transmitter, configured to perform multiplexing transmission on UCI and uplink data to be transmitted by the time-domain overlapping channel group, the UCI including the uplink SR.

According to a fourth aspect of the present disclosure, an uplink transmission apparatus may include:

a receiver, configured to receive a PUSCH or receive a PUSCH and a PUCCH; and a parsing module, configured to perform parsing to obtain UCI and uplink data subjected to multiplexing transmission through the PUSCH or through the PUSCH and the PUCCH, the UCI including an uplink SR.

According to a fifth aspect of the present disclosure, an uplink transmission apparatus is provided, which may include: a processor; and memory configured to store instructions executable by the processor. The processor may be configured to: determine a time-domain overlapping channel group to be transmitted in a time unit, where the time-domain overlapping channel group includes a group of PUCCHs and a group of PUSCHs, the group of PUCCHs and the group of PUSCHs include a PUCCH and a PUSCH that overlap in a time domain, the PUCCH included in the group of PUCCHs is configured to transmit an uplink SR and the PUSCH included in the group of PUSCHs is configured to transmit uplink data; and instruct the apparatus to perform multiplexing transmission on UCI and uplink data to be transmitted by the time-domain overlapping channel group, the UCI including the uplink SR.

According to a sixth aspect of the present disclosure, an uplink transmission apparatus is provided, which may include: a processor; and memory configured to store instructions executable by the processor. The processor may be configured to: receive a PUSCH or receive a PUSCH and a PUCCH; and perform parsing to obtain UCI and uplink data subjected to multiplexing transmission through the PUSCH or through the PUSCH and the PUCCH, the UCI including an uplink SR.

According to a seventh aspect of the present disclosure, a computer-readable storage medium is provided, which has stored computer instructions that, when executed by a processor, implement the uplink transmission method applicable to a User Equipment (UE) side.

According to an eighth aspect of the present disclosure, a computer-readable storage medium is provided, which has stored computer instructions that, when executed by a processor, implement the uplink transmission method applicable to a base station side.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

In the related art, Uplink Control Information (UCI) usually includes Hybrid Automatic Repeat reQuest (HARQ) indication information, a Scheduling Request (SR) and Channel State Information (CSI). The SR is configured for UE to apply to a base station side for scheduling uplink resources. In New Radio (NR), for supporting multiple services with different Quality of Service (QoS) requirements, e.g., quality/security, different SR configurations may be made for the same UE.

Figure 1:
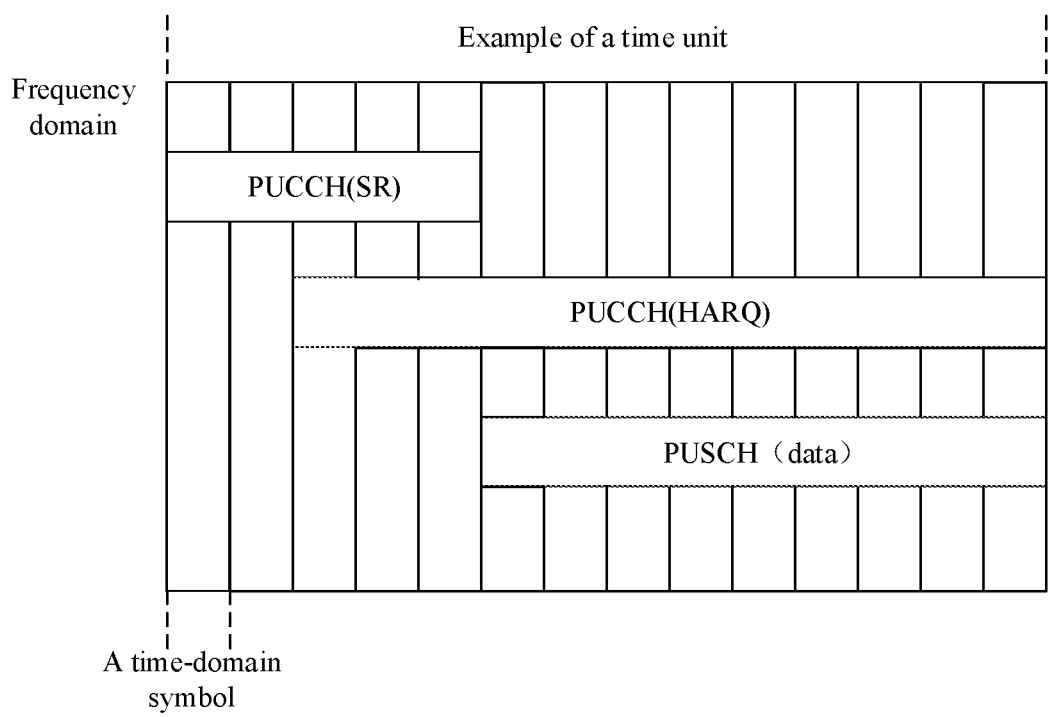
FIG. 1 is a schematic diagram illustrating uplink transmission according to an example.

Media Access Control (MAC) layer of UE can ensure that an SR may not be transmitted in a PUCCH that overlaps a PUSCH in time-domain, and thus there is no solution for performing multiplexing transmission of an SR and a PUSCH in existing protocols. However, as shown in FIG. 1, a PUCCH transmitting an SR and a PUCCH transmitting a HARQ overlap in time-domain, and the PUCCH transmitting the HARQ and a PUSCH transmitting uplink data overlap in time-domain. Although the PUCCH transmitting the SR and the PUSCH transmitting the uplink data do not overlap in time-domain, but when a certain condition is met, multiplexing transmission of the SR and the PUSCH may occur because of existence of the PUCCH transmitting the HARQ.

For solving the abovementioned problem, the embodiments provide solutions for uplink information transmission where there is a time-domain overlapping channel group.

Figure 2:
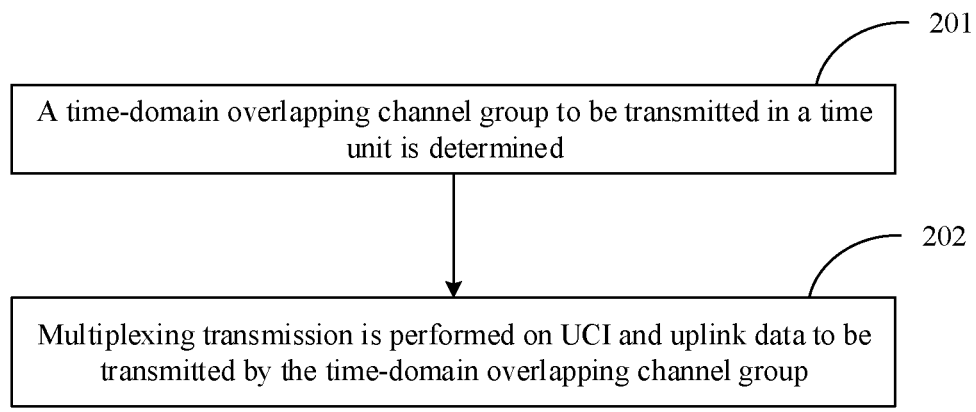
FIG. 2 is a flowchart showing an uplink transmission method according to an example.

FIG. 2 is a flowchart showing an uplink transmission method according to an example. The uplink transmission method is applicable to UE accessing a mobile network. The UE may be a mobile phone, a computer, a digital broadcast terminal, a messaging apparatus, a gaming console, a tablet, a medical apparatus, exercise equipment, a personal digital assistant and the like. As shown in FIG. 2, the method includes the following Operations 201 to 202.

In Operation 201, a time-domain overlapping channel group to be transmitted in a time unit is determined. The time-domain overlapping channel group includes a group of PUCCHs and a group of PUSCHs. The group of PUCCHs and the group of PUSCHs include a PUCCH and a PUSCH that overlap in time-domain. The PUCCH included in the group of PUCCHs is configured to transmit an uplink SR, and the PUSCH included in the group of PUSCHs is configured to transmit uplink data.

The time-domain overlapping channel group is a group of channels, to be transmitted in a time unit, overlap in time-domain.

In Operation 202, multiplexing transmission is performed on UCI and the uplink data to be transmitted by the time-domain overlapping channel group, and the UCI includes the uplink SR.

In the embodiment, the group of PUCCHs includes a PUCCH configured to transmit an uplink SR, and may also include a PUCCH configured to transmit other UCI than the uplink SR. The UE determines a time-domain overlapping channel group exists when a PUCCH and a PUSCH overlap in time-domain. The PUCCH involving time-domain overlapping may be a PUCCH configured to transmit an uplink SR and/or a PUCCH configured to transmit other UCI.

The time unit may be a time slot, a preset time period, or another time unit.

When it is determined that the time-domain overlapping channel group to be transmitted exists, multiplexing transmission may be performed on UCI and uplink data to be transmitted by the time-domain overlapping channel group. Whether to transmit an uplink SR or not is taken into consideration. How to transmit the uplink SR may be considered when the uplink SR is to be transmitted. Related considerations may include whether there is other UCI and how to transmit the uplink data and other UCI than the uplink SR.

The other UCI at least may include one of: uplink HARQ feedback information and CSI.

Figure 2A:
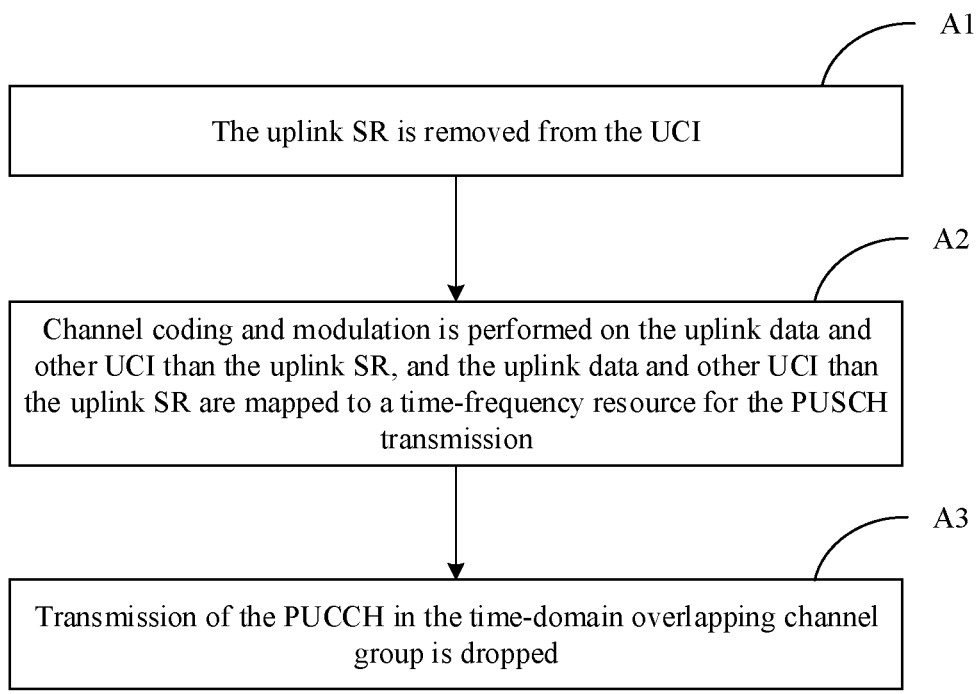
FIG. 2A is a flowchart showing an uplink transmission method according to an example.

In one or more embodiments, as shown in FIG. 2A which is a flowchart showing an uplink transmission method according to an example, Operation 202 may include Operation A1 to Operation A3.

In Operation A1, the uplink SR is removed from the UCI.

In Operation A2, channel coding and modulation is performed on the uplink data and other UCI than the uplink SR, and the uplink data and other UCI than the uplink SR are mapped to a time-frequency resource for the PUSCH transmission.

In Operation A3, transmission of the PUCCH in the time-domain overlapping channel group is dropped.

In the embodiment, when there is an uplink SR to be transmitted, the uplink SR may be removed, and the PUCCH transmission may be dropped. When there is other UCI to be transmitted, the other UCI than the uplink SR and the uplink data may be multiplexed to the time-frequency resource for the PUSCH transmission. In such a manner, the existing protocols are influenced little, and an effect that may be achieved by solutions of the protocols can also be achieved.

Figure 3:
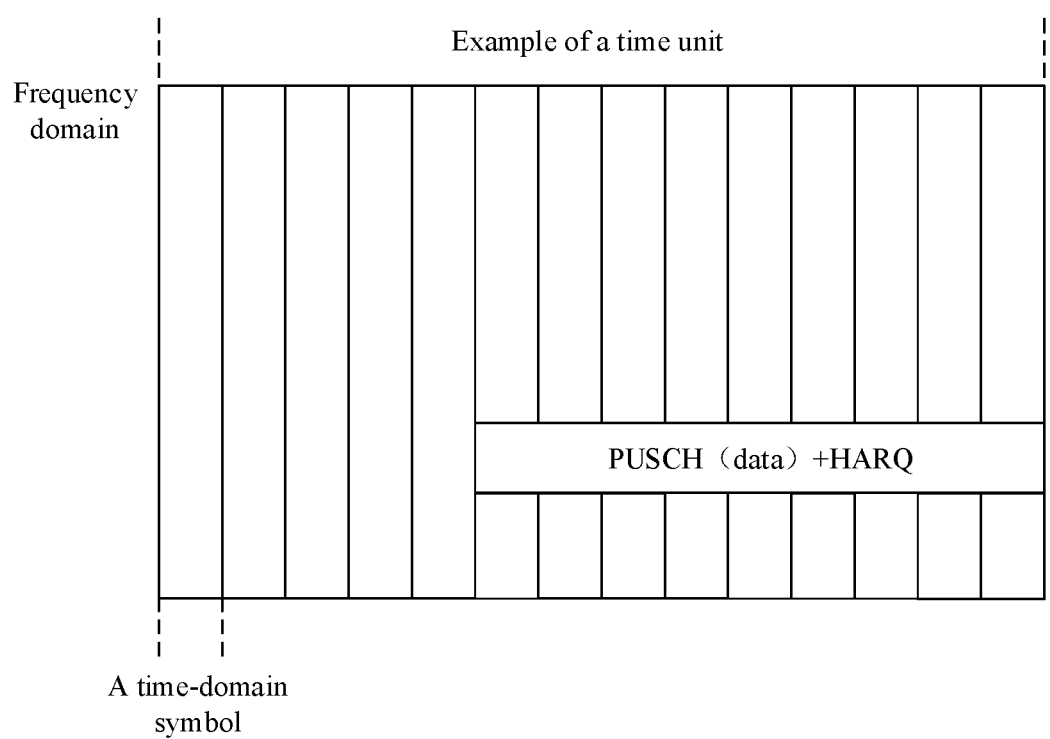
FIG. 3 is a schematic diagram illustrating uplink transmission according to an example.

As shown in FIG. 3, the PUCCH transmission is dropped. For example, the other UCI may be HARQ feedback information. A HARQ and uplink data may be multiplexed in the time-frequency resource of the PUSCH transmission. The other UCI may be processed by a channel coding and modulation manner for itself, and then may be mapped to the time-frequency resource for the PUSCH. The uplink data may be also processed by a channel coding and modulation manner for itself, and then may be mapped to the time-frequency resource for the PUSCH.

Figure 2B:
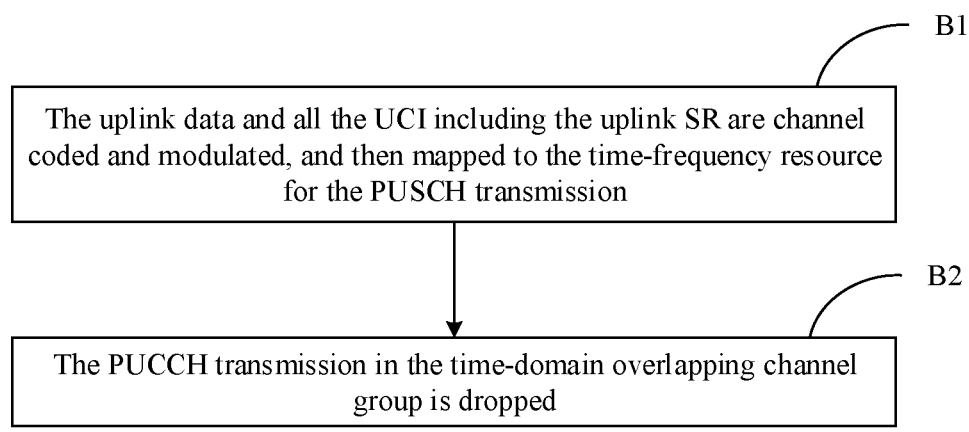
FIG. 2B is a flowchart showing an uplink transmission method according to an example.

In one or more embodiments, as shown in FIG. 2B which is a flowchart showing an uplink transmission method according to an example, Operation 202 includes Operation B1 to Operation B2.

In Operation B1, the uplink data and all the UCI including the uplink SR are channel coded and modulated, and then mapped to the time-frequency resource for the PUCCH transmission.

In Operation B2, the PUCCH transmission in the time-domain overlapping channel group is dropped.

In the embodiment, the PUCCH transmission is dropped, but the uplink SR is not dropped. Instead, the uplink SR and the uplink data are transmitted in a multiplexing transmission manner. There are multiple implementation modes, referring to the following embodiments.

Figure 2C:
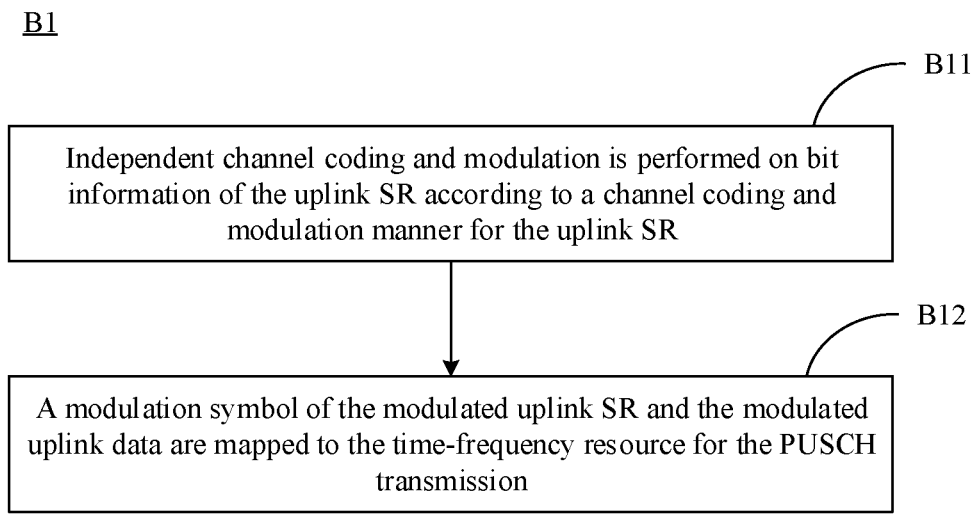
FIG. 2C is a flowchart showing an uplink transmission method according to an example.

In one or more embodiments, as shown in FIG. 2C which is a flowchart showing an uplink transmission method according to an example, Operation B1 includes Operation B11 to Operation B12.

In Operation B11, independent channel coding and modulation is performed on bit information of the uplink SR according to a channel coding and modulation manner for the uplink SR.

In Operation B12, a modulation symbol of the modulated uplink SR and the modulated uplink data are mapped to the time-frequency resource for the PUSCH transmission.

In the embodiment, the uplink SR in a data information format may be converted to a bit information format to obtain the bit information of the uplink SR. The bit information of the uplink SR represents whether the uplink SR is activated or not, and which uplink SR is activated when there are multiple uplink SR configurations. Then, channel coding and modulation may be performed on the bit information.

The channel coding and modulation manner for the uplink SR during multiplexing transmission may be pre-configured by a base station, or may be determined by the bit amount of the uplink SR, the bit amount and/or a modulation/coding scheme for transmission of the uplink data, and the amount of time-frequency resource units of the PUSCH. When multiplexing transmission is needed, channel coding and modulation may be performed on the bit information of the uplink SR according to the channel coding and modulation manner for the uplink SR. Then, the modulation symbol of the modulated uplink SR may be mapped to a specific time-frequency resource unit position of the time-frequency resource for the PUSCH transmission. The specific time-frequency resource unit position may be specified or configured in advance. For example, the modulation symbol may be mapped to a time-domain symbol adjacent to a demodulation reference symbol and uniformly distributed in a frequency-domain bandwidth occupied by the PUSCH.

Figure 4:
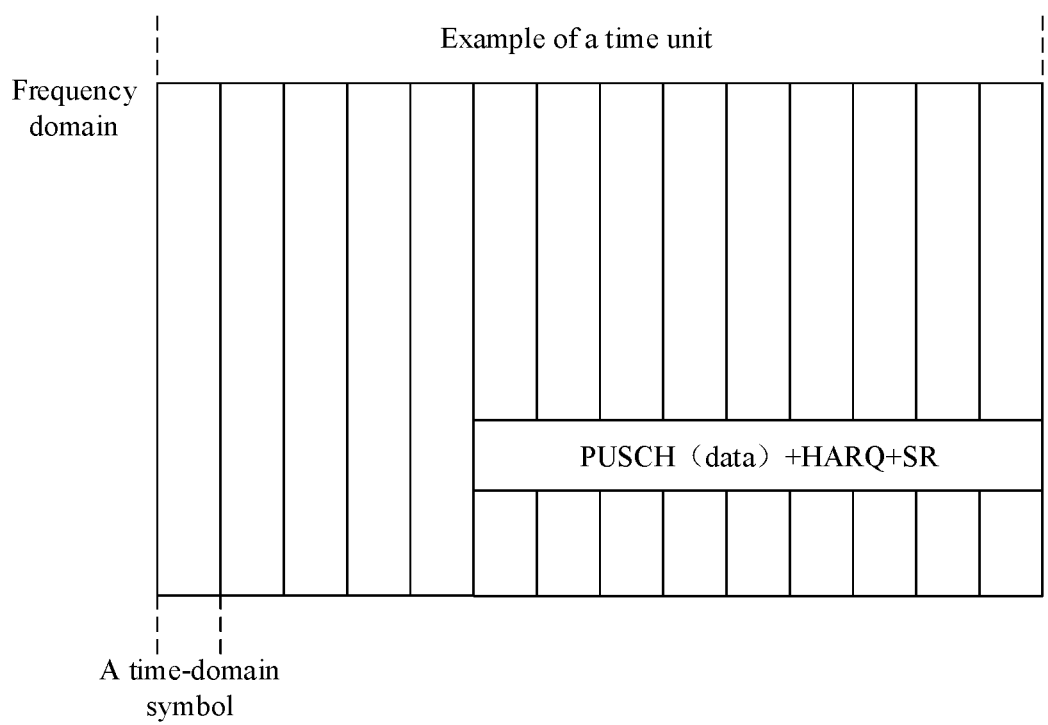
FIG. 4 is a schematic diagram illustrating uplink transmission according to an example.

In the embodiment, there may be other UCI to be transmitted. A modulation symbol may also be generated correspondingly for the other UCI according to the channel coding and modulation manner for the other UCI. A modulation symbol of the uplink data may be also generated according to a modulation and coding scheme notified by the base station. The modulation symbol of the uplink SR, the modulation symbol of the other UCI and the modulation symbol of the uplink data may be sequentially mapped to corresponding time-frequency resource positions of the PUSCH in a specified sequence. For example, a modulation symbol of an uplink SR may be mapped at first, then a modulation symbol of HARQ feedback information may be mapped, later on, a modulation symbol of CSI may be mapped, and finally, a modulation symbol of uplink data may be mapped. Or, the a modulation symbol of the other UCI and/or the uplink data may be mapped at first, then the modulation symbol of the uplink SR is mapped. If the a modulation symbol of the uplink data and the uplink SR are mapped to the same time-frequency resource position, the firstly mapped modulation symbol of the uplink data may be replaced with the modulation symbol of the uplink SR. As shown in FIG. 4, transmission of the PUCCH is dropped, and the uplink SR, the uplink data and other UCI than the uplink SR are multiplexed to the time-frequency resource of the PUSCH.

Figure 2D:
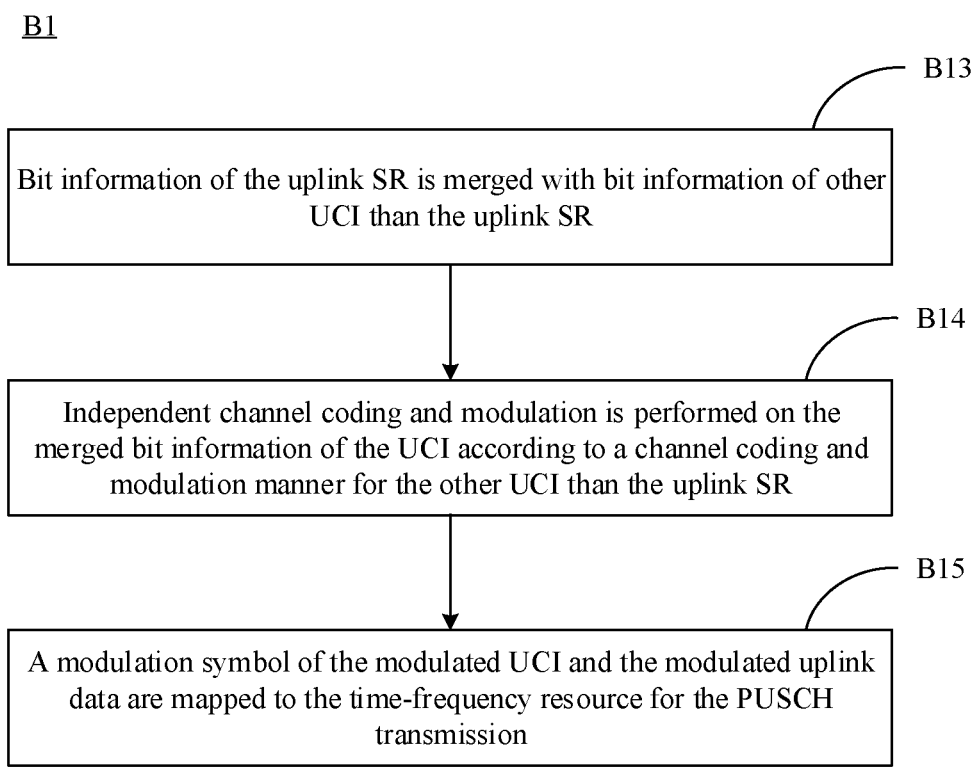
FIG. 2D is a flowchart showing an uplink transmission method according to an example.

In one or more embodiments, as shown in FIG. 2D which is a flowchart showing an uplink transmission method according to an example, Operation B1 includes Operation B13 to Operation B15.

In Operation B13, bit information of the uplink SR is merged with bit information of other UCI than the uplink SR.

In Operation B14, independent channel coding and modulation is performed on the merged bit information of the UCI according to a channel coding and modulation manner for the other UCI than the uplink SR.

In Operation B15, a modulation symbol of the modulated UCI and the modulated uplink data are mapped to the time-frequency resource for the PUSCH transmission.

In the embodiment, the other UCI needed to be transmitted exists. There may be multiple types of other UCI, for example, HARQ and CSI. Channel coding and modulation schemes and resource mapping solutions for multiplexing transmission of different types of other UCI than the SR and the uplink data may refer to protocols TS38.211, TS38.212 and TS38.213. Therefore, the bit information of the uplink SR may be merged with bit information of a type of the other UCI needed to be transmitted, than multiplexing transmission may be performed on it and the uplink data according to the same solution, and channel coding and modulation may be performed on it and the type of other UCI.

If there is also other UCI needed to be transmitted than the type of other UCI, the other UCI may be independently processed according to a channel coding and modulation manner for it per se.

The uplink data may be also independently processed according to the channel coding and modulation manner for it per se.

The modulation symbol obtained by modulation may be mapped to the time-frequency resource for the PUSCH transmission, which may refer to the example shown in FIG. 4.

Figure 2E:
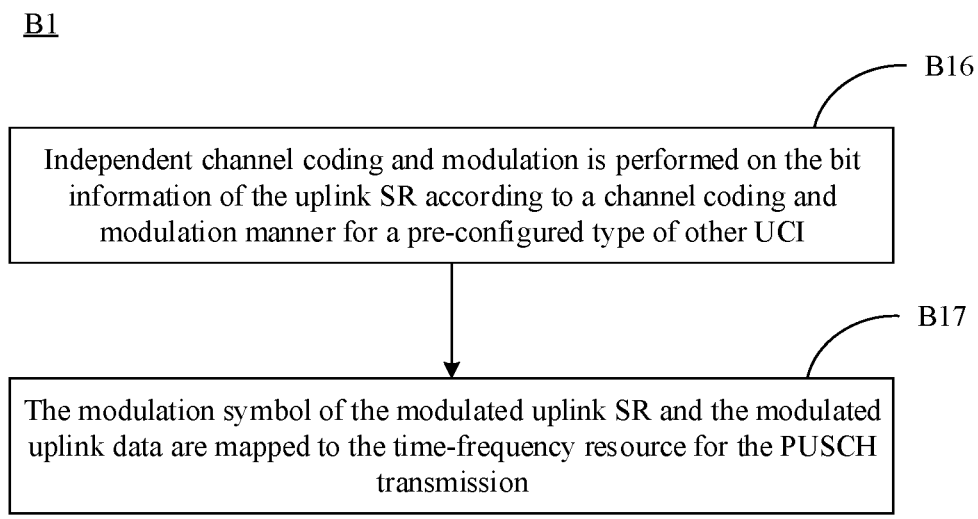
FIG. 2E is a flowchart showing an uplink transmission method according to an example.

In one or more embodiments, as shown in FIG. 2E which is a flowchart showing an uplink transmission method according to an example, Operation B1 includes Operation B16 to Operation B17.

In Operation B16, independent channel coding and modulation is performed on the bit information of the uplink SR according to a channel coding and modulation manner for a pre-configured type of other UCI.

In Operation B17, the modulation symbol of the modulated uplink SR and the modulated uplink data are mapped to the time-frequency resource for the PUSCH transmission.

In the embodiment, there is no other UCI needed to be transmitted. However, independent channel coding and modulation is required to be performed on the uplink SR according to a channel coding and modulation manner for a type of other UCI. The type of other UCI may be pre-configured. No matter whether the type of other UCI needs to be transmitted, channel coding and modulation may be performed on the uplink SR according to a channel coding and modulation manner for the type of other UCI.

The uplink data may be independently processed according to the channel coding and modulation manner for it per se.

Figure 5:
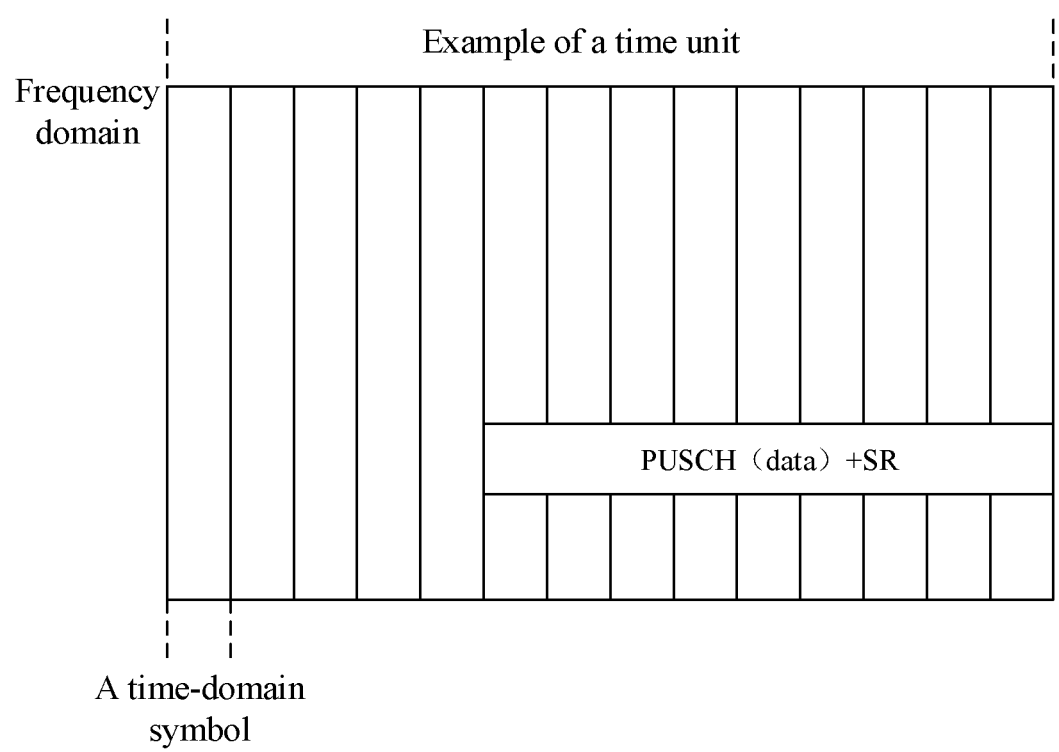
FIG. 5 is a schematic diagram illustrating uplink transmission according to an example.

The modulation symbol obtained by modulation are mapped to the time-frequency resource for the PUSCH transmission, as shown in FIG. 5.

Figure 2F:
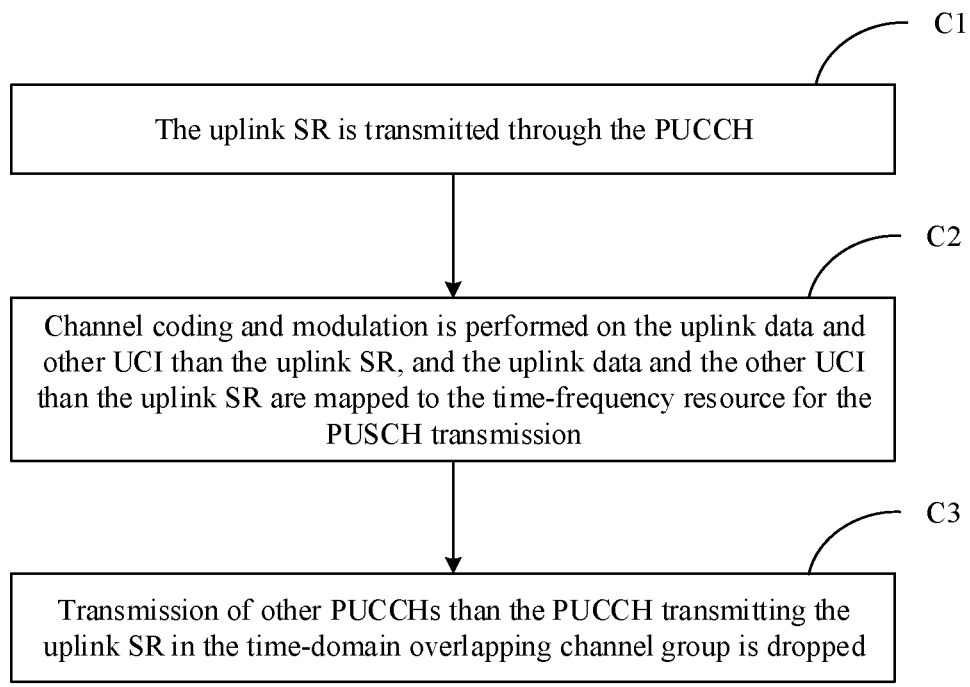
FIG. 2F is a flowchart showing an uplink transmission method according to an example.

In one or more embodiments, as shown in FIG. 2F which is a flowchart showing an uplink transmission method according to an example, Operation 202 includes Operation C1 to Operation C3.

In Operation C1, the uplink SR is transmitted through the PUCCH.

In Operation C2, channel coding and modulation is performed on the uplink data and other UCI than the uplink SR, and the uplink data and the other UCI than the uplink SR are mapped to the time-frequency resource for the PUSCH transmission.

In Operation C3, transmission of other PUCCHs than the PUCCH transmitting the uplink SR in the time-domain overlapping channel group is dropped.

Figure 6:
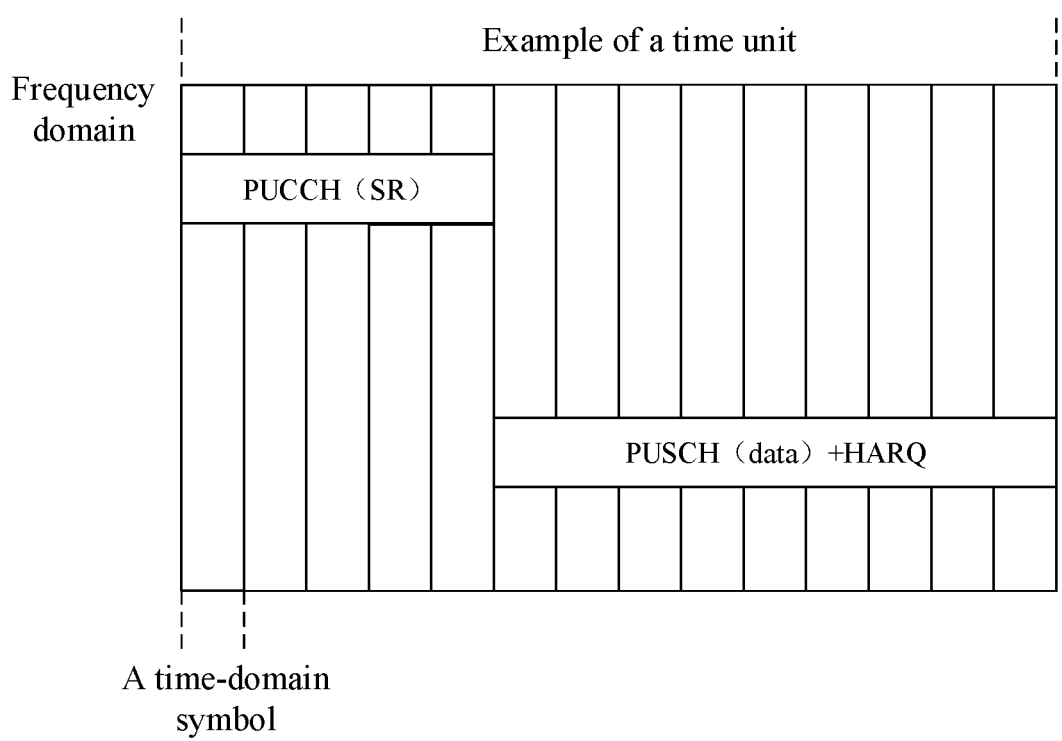
FIG. 6 is a schematic diagram illustrating uplink transmission according to an example.

In the embodiment, when the UE determines that the time-domain overlapping channel group needed to be transmitted exists, the uplink SR is still transmitted through the PUCCH, while the uplink data and the other UCI than the uplink SR are mapped to the time-frequency resource for the PUSCH transmission, as shown in FIG. 6.

The uplink SR, the uplink data and the other UCI may be processed according to the channel coding and modulation manners for them respectively.

The implementation process will be introduced below through some embodiments in detail.

Figure 7:
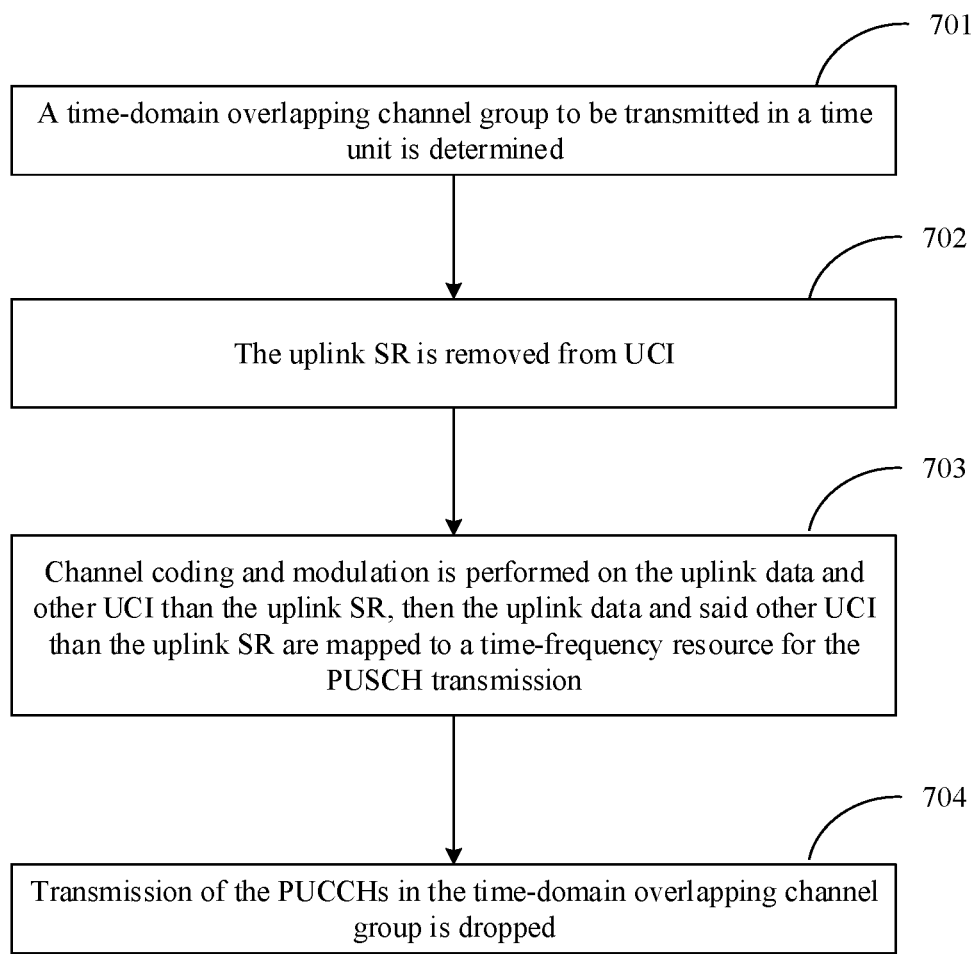
FIG. 7 is a flowchart showing an uplink transmission method according to an example.

FIG. 7 is a flowchart showing an uplink transmission method according to an example. The uplink transmission method is applicable to UE accessing a mobile network. The UE may be a mobile phone, a computer, a digital broadcast terminal, a messaging apparatus, a gaming console, a tablet, a medical apparatus, exercise equipment, a personal digital assistant and the like. As shown in FIG. 7, the method includes the following Operations 701 to 704.

In Operation 701, a time-domain overlapping channel group to be transmitted in a time unit is determined. The time-domain overlapping channel group includes a group of PUCCHs and a group of PUSCHs, the group of PUCCHs and the group of PUSCHs include a PUCCH and a PUSCH that overlap in a time domain, the PUCCH included in the group of PUCCHs is configured to transmit an uplink SR, and the PUSCH included in the group of PUCCHs is configured to transmit uplink data.

The time-domain overlapping channel group is a group of channels, to be transmitted in a time unit, overlap in time-domain.

In Operation 702, the uplink SR is removed from UCI.

In Operation 703, channel coding and modulation is performed on the uplink data and other UCI than the uplink SR, then the uplink data and the other UCI than the uplink SR are mapped to a time-frequency resource for the PUSCH transmission.

In Operation 704, transmission of the PUCCHs in the time-domain overlapping channel group is dropped.

Figure 8:
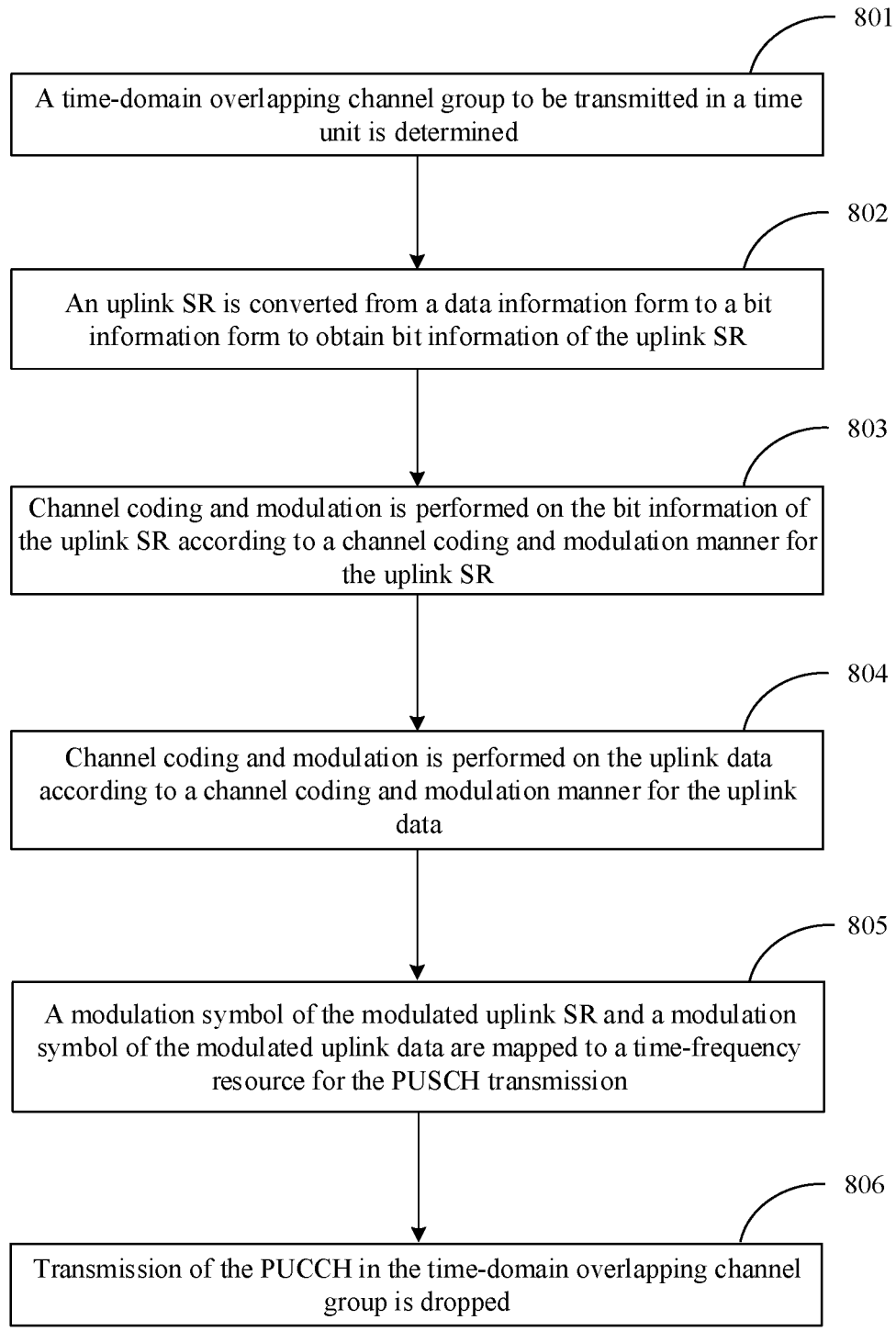
FIG. 8 is a flowchart showing an uplink transmission method according to an example.

FIG. 8 is a flowchart showing an uplink transmission method according to an example. The uplink transmission method is applicable to UE with a mobile network. The UE may be a mobile phone, a computer, a digital broadcast terminal, a messaging apparatus, a gaming console, a tablet, a medical apparatus, exercise equipment, a personal digital assistant and the like. As shown in FIG. 8, the method includes the following Operations 801 to 806.

In Operation 801, a time-domain overlapping channel group to be transmitted in a time unit is determined. The time-domain overlapping channel group includes a group of PUCCHs and a group of PUSCHs, the group of PUCCHs and the group of PUSCHs include a PUCCH and a PUSCH that overlap in time-domain, the PUCCH included in the group of PUCCHs is configured to transmit an uplink SR, and the PUSCH included in the group of PUSCHs is configured to transmit uplink data.

The time-domain overlapping channel group is a group of channels, to be transmitted in a time unit, overlap in time-domain.

In Operation 802, the uplink SR is converted from a data information format to a bit information format to obtain bit information of the uplink SR.

In Operation 803, channel coding and modulation is performed on the bit information of the uplink SR according to a channel coding and modulation manner for the uplink SR.

In Operation 804, channel coding and modulation is performed on the uplink data according to a channel coding and modulation manner for the uplink data.

Operation 803 and Operation 804 may be executed at the same time.

In Operation 805, a modulation symbol of the modulated uplink SR and a modulation symbol of the modulated uplink data are mapped to a time-frequency resource for the PUSCH transmission.

In Operation 806, transmission of the PUCCH in the time-domain overlapping channel group is dropped.

Operation 806 and Operations 802-805 are two independent processes and may be executed at the same time.

Figure 9:
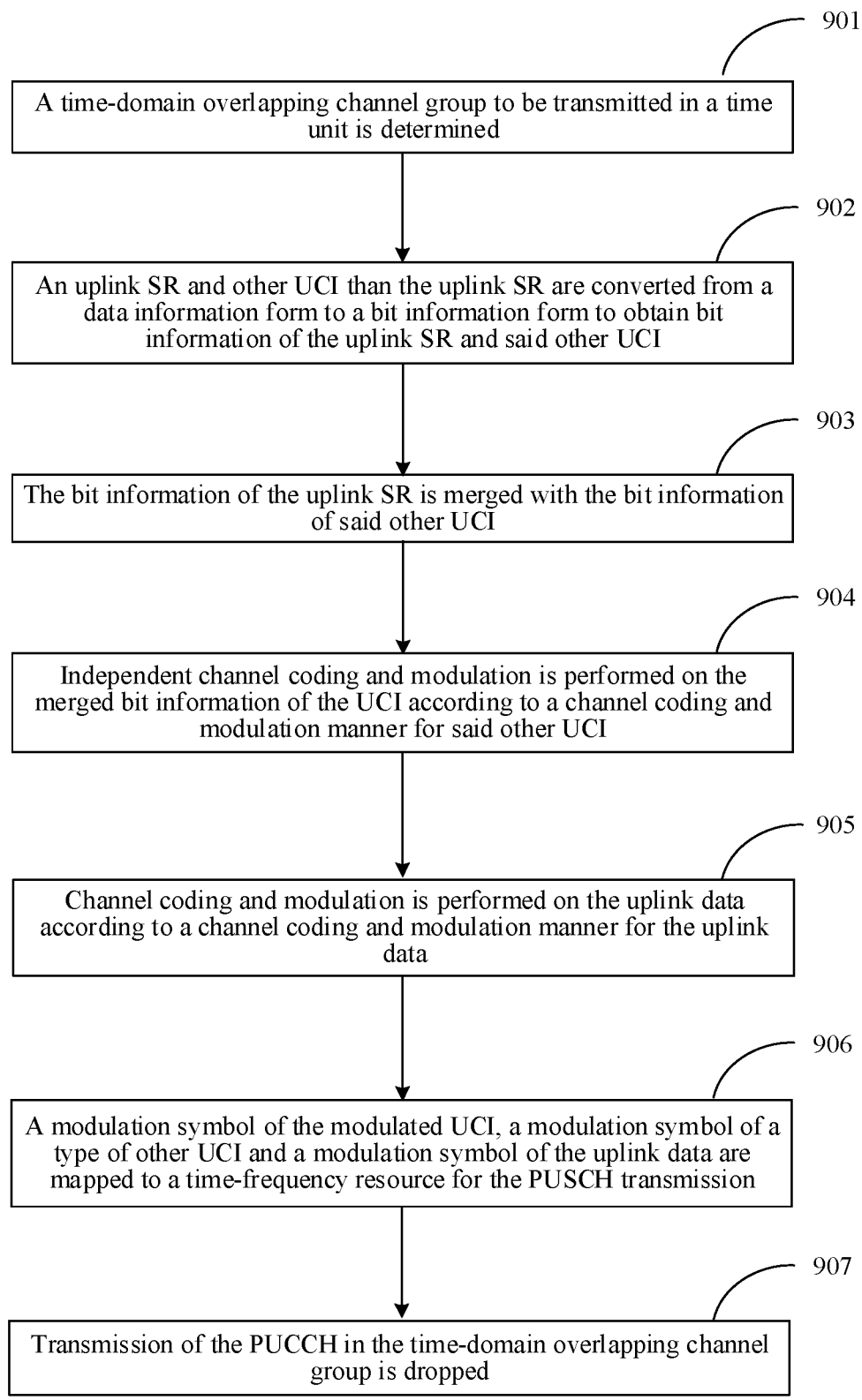
FIG. 9 is a flowchart showing an uplink transmission method according to an example.

FIG. 9 is a flowchart showing an uplink transmission method according to an example. The uplink transmission method is applicable to UE with a mobile network. The UE may be a mobile phone, a computer, a digital broadcast terminal, a messaging apparatus, a gaming console, a tablet, a medical apparatus, exercise equipment, a personal digital assistant and the like. As shown in FIG. 9, the method includes the following Operations 901 to 907.

In Operation 901, a time-domain overlapping channel group to be transmitted in a time unit is determined. The time-domain overlapping channel group includes a group of PUCCHs and a group of PUSCHs, the group of PUCCHs and the group of PUSCHs include a PUCCH and a PUSCH that overlap in a time domain, the PUCCH included in the group of PUCCHs is configured to transmit an uplink SR, and the PUSCH included in the group of PUCCHs is configured to transmit uplink data.

The time-domain overlapping channel group is a group of channels, to be transmitted in a time unit, overlap in time-domain.

In Operation 902, the uplink SR and a type of other UCI than the uplink SR are converted from a data information format to a bit information format to obtain bit information of the uplink SR and the type of other UCI.

In Operation 903, the bit information of the uplink SR is merged with the bit information of the type of other UCI.

In Operation 904, independent channel coding and modulation is performed on the merged bit information of the UCI according to a channel coding and modulation manner for the type of other UCI.

In Operation 905, channel coding and modulation is performed on the uplink data according to a channel coding and modulation manner for the uplink data.

In Operation 906, a modulation symbol of the modulated UCI, a modulation symbol of a type of other UCI and a modulation symbol of the uplink data are mapped to a time-frequency resource for the PUSCH transmission.

In Operation 907, transmission of the PUCCH in the time-domain overlapping channel group is dropped.

Figure 10:
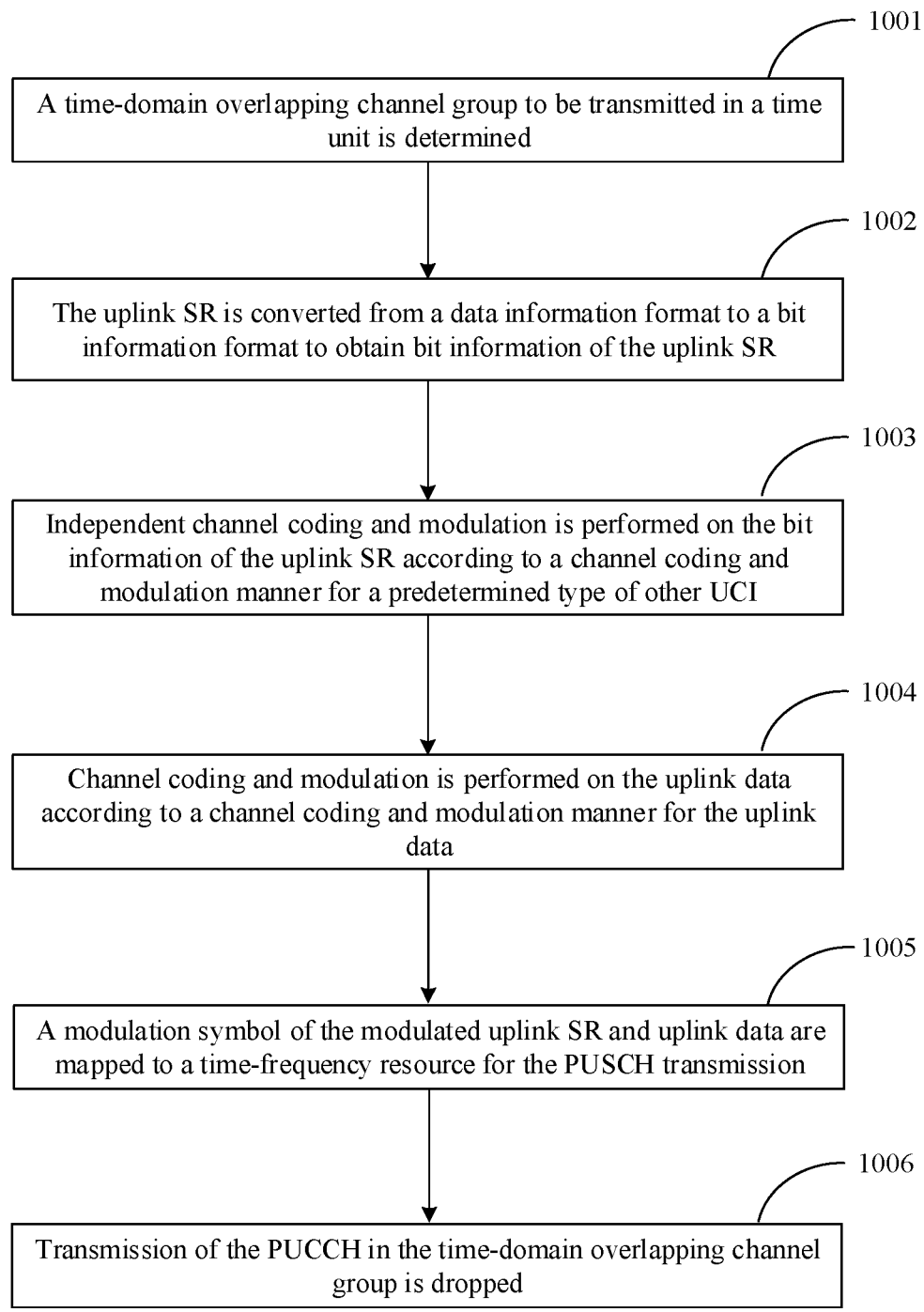
FIG. 10 is a flowchart showing an uplink transmission method according to an example.

FIG. 10 is a flowchart showing an uplink transmission method according to an example. The uplink transmission method is applicable to UE with a mobile network. The UE may be a mobile phone, a computer, a digital broadcast terminal, a messaging apparatus, a gaming console, a tablet, a medical apparatus, exercise equipment, a personal digital assistant and the like. As shown in FIG. 10, the method includes the following Operations 1001 to 1006.

In Operation 1001, a time-domain overlapping channel group to be transmitted in a time unit is determined. The time-domain overlapping channel group includes a group of PUCCHs and a group of PUSCHs, the group of PUCCHs and the group of PUSCHs include a PUCCH and a PUSCH that overlap in time-domain, the PUCCH included in the group of PUCCHs is configured to transmit an uplink SR, and the PUSCH included in the group of PUSCHs is configured to transmit uplink data.

In Operation 1002, the uplink SR is converted from a data information format to a bit information format to obtain bit information of the uplink SR.

In Operation 1003, independent channel coding and modulation is performed on the bit information of the uplink SR according to a channel coding and modulation manner for a pre-configured type of other UCI.

In Operation 1004, channel coding and modulation is performed on the uplink data according to a channel coding and modulation manner for the uplink data.

In Operation 1005, a modulation symbol of the modulated uplink SR and uplink data are mapped to a time-frequency resource for the PUSCH transmission.

In Operation 1006, transmission of the PUCCH in the time-domain overlapping channel group is dropped.

Figure 11:
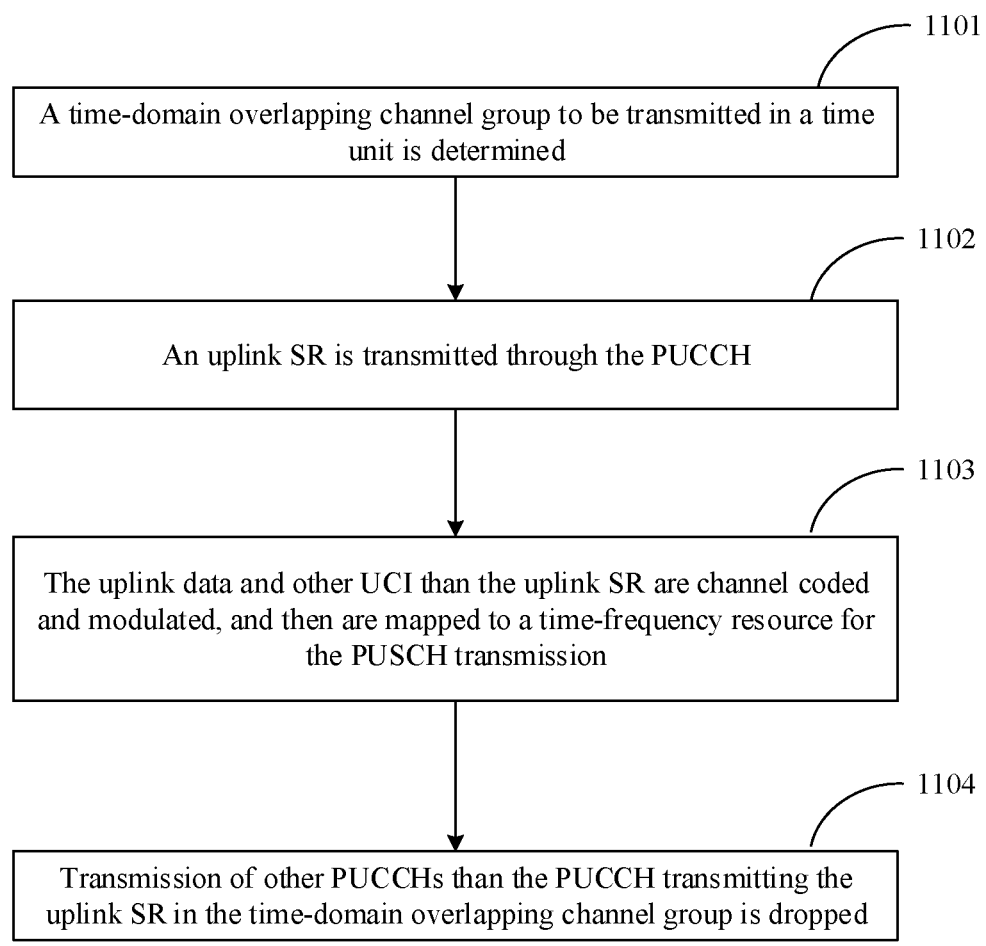
FIG. 11 is a flowchart showing an uplink transmission method according to an example.

FIG. 11 is a flowchart showing an uplink transmission method according to an example. The uplink transmission method is applicable to UE with a mobile network. The UE may be a mobile phone, a computer, a digital broadcast terminal, a messaging apparatus, a gaming console, a tablet, a medical apparatus, exercise equipment, a personal digital assistant and the like. As shown in FIG. 11, the method includes the following Operations 1101 to 1104.

In Operation 1101, a time-domain overlapping channel group to be transmitted in a time unit is determined. The time-domain overlapping channel group includes a group of PUCCHs and a group of PUSCHs, the group of PUCCHs and the group of PUSCHs include a PUCCH and a PUSCH that overlap in time-domain, the PUCCH included in the group of PUCCHs is configured to transmit an uplink SR and the PUSCH included in the group of PUSCHs is configured to transmit uplink data.

The time-domain overlapping channel group is a group of channels, to be transmitted in a time unit, overlap in time-domain.

In Operation 1102, the uplink SR is transmitted through the PUCCH.

In Operation 1103, the uplink data and other UCI than the uplink SR are channel coded and modulated, and then are mapped to a time-frequency resource for the PUSCH transmission.

In Operation 1104, transmission of other PUCCHs than the PUCCH transmitting the uplink SR in the time-domain overlapping channel group is dropped.

The implementation modes of uplink transmission for the UE are introduced above. Correspondingly, the base station needs to correspondingly perform parsing to obtain uplink information. An implementation process on the base station side will be introduced below.

Figure 12:
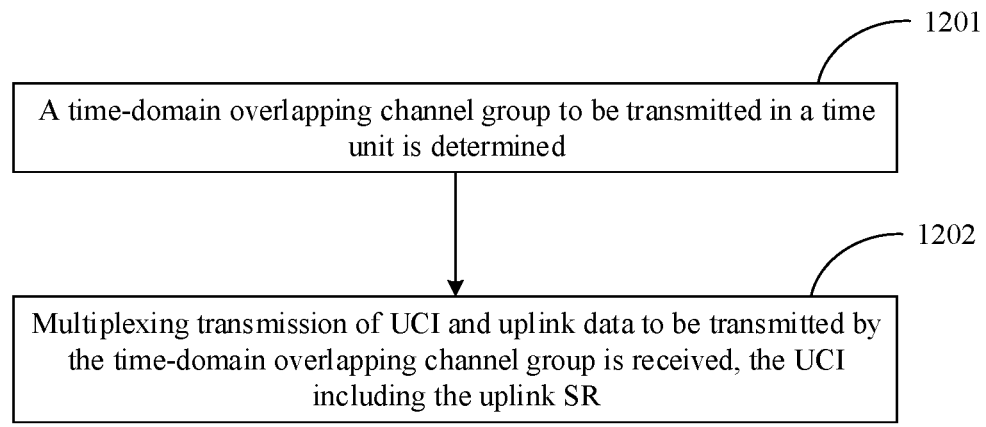
FIG. 12 is a flowchart showing an uplink transmission method according to an example.

FIG. 12 is a flowchart showing an uplink transmission method according to an example. The uplink transmission method is applicable to an access network apparatus such as a base station. As shown in FIG. 12, the method includes the following Operations 1201 to 1202.

In Operation 1201, a time-domain overlapping channel group to be transmitted in a time unit is determined, wherein the time-domain overlapping channel group includes a group of PUCCHs and a group of PUSCHs, the group of PUCCHs and the group of PUSCHs include a PUCCH and a PUSCH that overlap in time-domain, the PUCCH included in the group of PUCCHs is configured to transmit an uplink SR, and the PUSCH included in the group of PUSCHs is configured to transmit uplink data.

The time-domain overlapping channel group is a group of channels, to be transmitted in a time unit, overlap in time-domain.

In Operation 1202, multiplexing transmission of UCI and uplink data to be transmitted by the time-domain overlapping channel group is received, the UCI includes the uplink SR.

In the embodiment, the group of PUCCHs includes the PUCCH configured to transmit an uplink SR, and may further include a PUCCH configured to transmit other UCI than the uplink SR. When UE determines that a PUCCH and a PUSCH overlap in time-domain, namely the time-domain overlapping channel group exists when the time-domain overlapping exists. The PUCCH involving time-domain overlapping may be a PUCCH configured to transmit an uplink SR and/or a PUCCH configured to transmit other UCI.

An uplink resource of the UE is configured by the base station or specified by a system, and thus the base station may know whether the time-domain overlapping channel group exists or not. Responsive to determining that the time-domain overlapping channel group exists, the base station receives uplink information in a multiplexing transmission manner. If there is no time-domain overlapping channel group, the base station may receive the uplink information in another manner.

In the embodiment, no matter whether the UCI and the uplink data are multiplexed to a time-frequency resource of the PUSCH, or multiplexed to a time-frequency resource of the PUCCH and the PUSCH, the uplink information may be obtained by parsing. The base station and the UE may have the same system configuration. There are multiple implementation modes for the UE. Correspondingly, there are also multiple implementation modes for the base station, referring to the following embodiments.

Figure 12A:
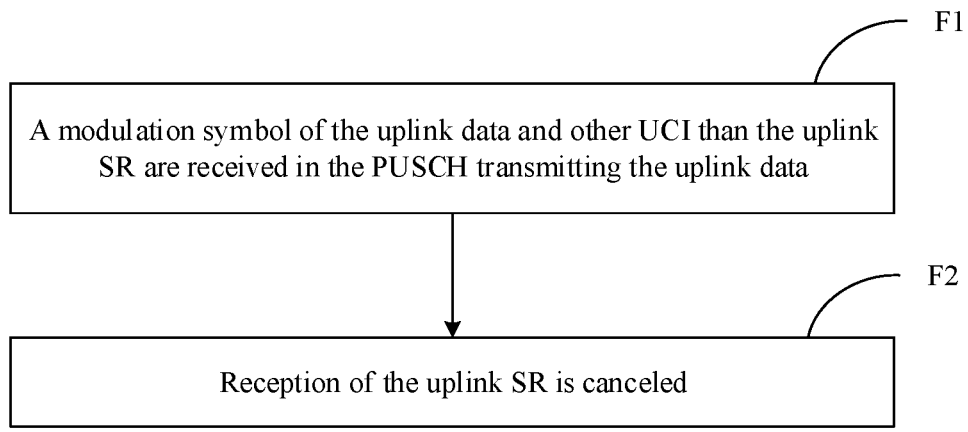
FIG. 12A is a flowchart showing an uplink transmission method according to an example.

In one or more embodiments, as shown in FIG. 12A which is a flowchart showing an uplink transmission method according to an example, Operation 1202 includes Operation F1 to Operation F2.

In Operation F1, a modulation symbol of the uplink data and other UCI than the uplink SR are received in the PUSCH transmitting the uplink data.

In Operation F2, reception of the uplink SR is canceled.

In the embodiment, corresponding to the embodiment of the UE side in FIG. 7, the UE drops transmission of the PUCCH. Correspondingly, the base station is only required to receive the PUSCH to obtain the modulation symbol of the uplink data and other UCI than the uplink SR, and then performs corresponding demodulation and channel decoding, etc.

Figure 12B:
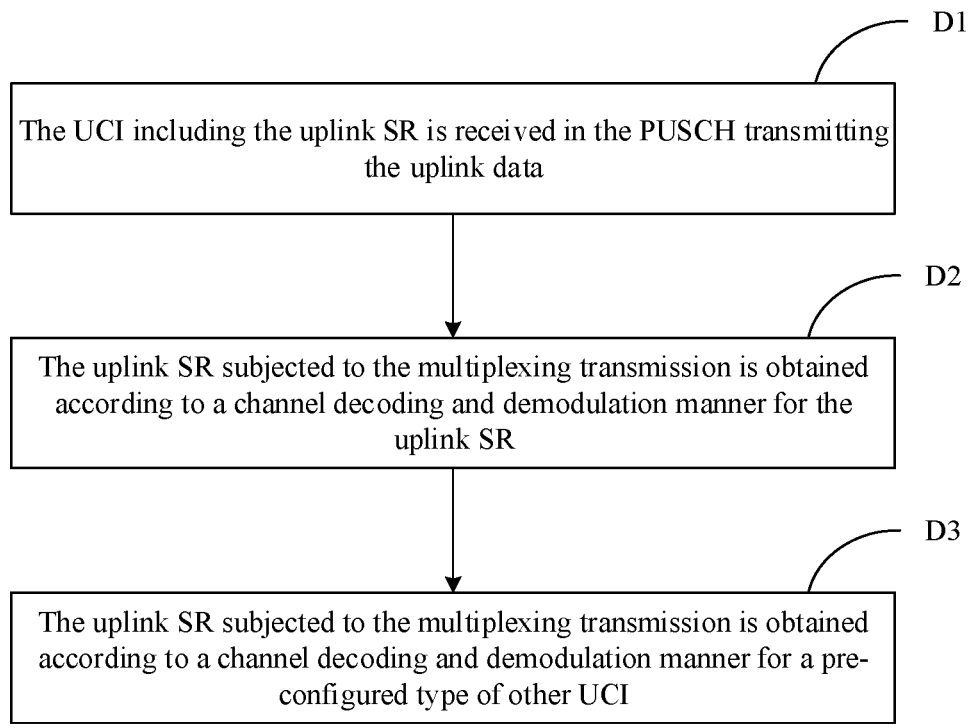
FIG. 12B is a flowchart showing an uplink transmission method according to an example.
Figure 12C:
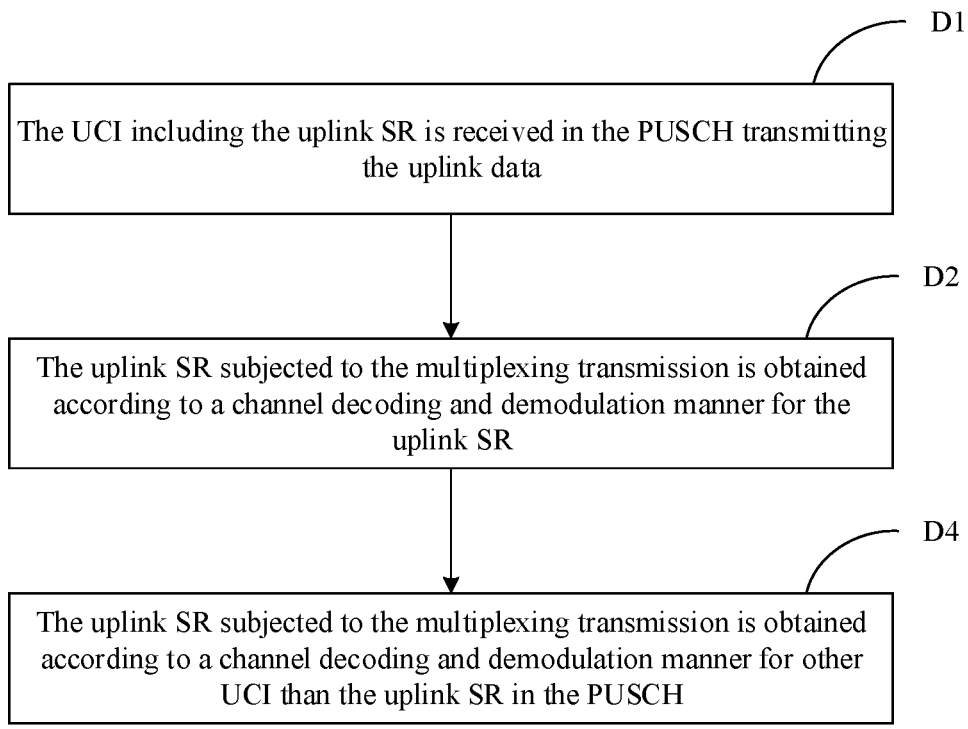
FIG. 12C is a flowchart showing an uplink transmission method according to an example.

In one or more embodiments, as shown in FIGS. 12B and 12C which are flowcharts showing an uplink transmission method according to an example, the action in the Operation 1202 that transmission of the UCI to be transmitted by the time-domain overlapping channel group is received may include Operation D1, Operation D2, and Operation D3 or Operation D4.

In Operation D1, the UCI including the uplink SR is received in the PUSCH transmitting the uplink data.

In Operation D2, the uplink SR subjected to the multiplexing transmission is obtained according to a channel decoding and demodulation manner for the uplink SR.

In the embodiment, corresponding to the embodiment of the UE in FIG. 8, the UE drops the PUCCH transmission. Correspondingly, the base station is only needed to receive the PUSCH to obtain the uplink SR subjected to the multiplexing transmission through the PUSCH according to the channel decoding and demodulation manner for the uplink SR, and obtain the uplink data subjected to the multiplexing transmission through the PUSCH. The UE may also transmit other UCI. If the UE transmits other UCI, the base station may obtain the other UCI subjected to the multiplexing transmission through the PUSCH according to a channel decoding and demodulation manner for the other UCI.

In Operation D3, the uplink SR subjected to the multiplexing transmission is obtained according to a channel decoding and demodulation manner for a pre-configured type of other UCI.

In the embodiment, corresponding to the embodiment of the UE side in FIG. 10, the UE drops the PUCCH transmission and does not transmit any other UCI. The base station obtains the uplink SR subjected to the multiplexing transmission through the PUSCH according to the channel decoding and demodulation manner for the pre-configured type of other UCI, and obtains the uplink data subjected to the multiplexing transmission through the PUSCH.

In Operation D4, the uplink SR subjected to the multiplexing transmission is obtained according to a channel decoding and demodulation manner for other UCI than the uplink SR in the PUSCH.

In the embodiment, corresponding to the embodiment of the UE side in FIG. 9, the UE drops transmission of the PUCCH and transmits other UCI. The base station obtains the uplink SR and other UCI subjected to multiplexing transmission through the PUSCH according to the channel decoding and demodulation manner for the transmitted UCI, and obtains the uplink data subjected to multiplexing transmission through the PUSCH. If the UE also transmits another type of other UCI besides the other UCI, the base station can obtain the another type of other UCI subjected to multiplexing transmission through the PUSCH according to a channel decoding and demodulation manner for the another type of other UCI.

In one or more embodiments, the UCI may include other UCI than the uplink SR.

Figure 12D:
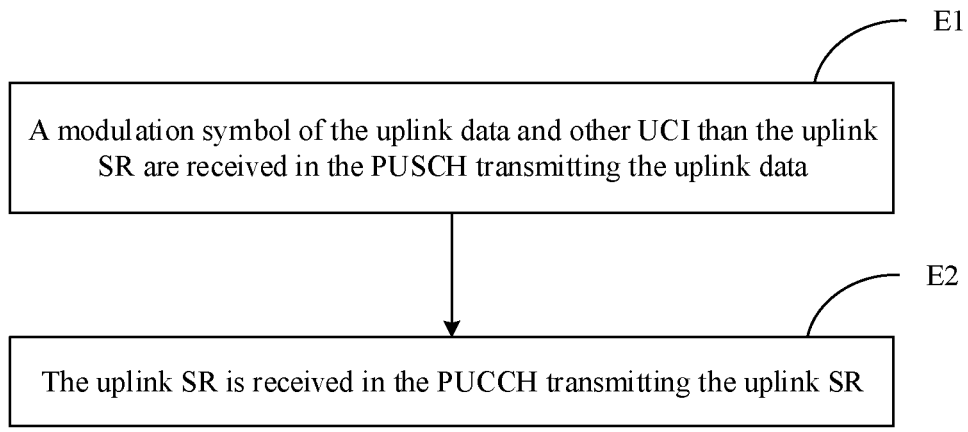
FIG. 12D is a flowchart showing an uplink transmission method according to an example.

As shown in FIG. 12D which is a flowchart showing an uplink transmission method according to an example, the action in Operation 1202 that parsing is performed to obtain the UCI and uplink data subjected to multiplexing transmission through the PUSCH and the PUCCH, includes Operation E1 and Operation E2.

In Operation E1, a modulation symbol of the uplink data and other UCI than the uplink SR are received in the PUSCH transmitting the uplink data.

In Operation E2, the uplink SR is received in the PUCCH transmitting the uplink SR.

In the embodiment, corresponding to the embodiment of the UE side in FIG. 11, the UE maintains the PUCCH. Therefore, the base station may obtain the other UCI and uplink data subjected to multiplexing transmission by parsing the PUSCH according to the channel decoding and demodulation manners for the uplink SR, the uplink data and other UCI than the uplink SR in the related arts. And the base station may obtain the uplink SR by parsing the PUCCH.

Corresponding to the embodiment of the UE side in FIG. 7, the UE drops transmission of the uplink SR. Therefore, the base station may obtain other UCI and uplink data subjected to multiplexing transmission by parsing the PUSCH according to the channel decoding and demodulation manners for the uplink data and the other UCI in the related arts.

The below are apparatus embodiments of the present disclosure, which may be configured to execute the method embodiment of the present disclosure.

Figure 13:
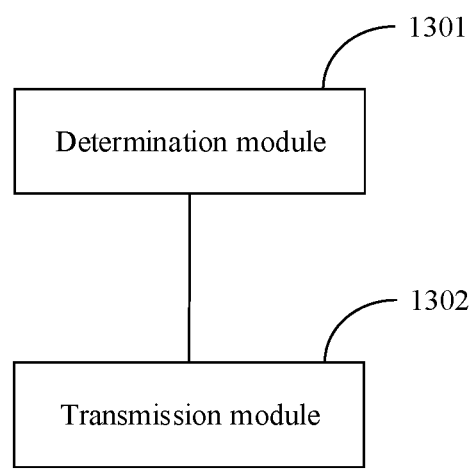
FIG. 13 is a block diagram of an uplink transmission apparatus according to an example.

FIG. 13 is a block diagram of an uplink transmission apparatus according to an example. The apparatus may be implemented into part or all of an electronic apparatus through software, hardware or a combination of the two. Referring to FIG. 13, the uplink transmission apparatus is applicable to UE and includes a determination module 1301 and a transmitter 1302.

The determination module 1301 is configured to determine a time-domain overlapping channel group to be transmitted in a time unit. The time-domain overlapping channel group includes a group of PUCCHs and a group of PUSCHs, the group of PUCCHs and the group of PUSCHs include a PUCCH and a PUSCH that overlap in a time domain, the PUCCH included in the group of PUCCHs is configured to transmit an uplink SR, and the PUSCH included in the group of PUSCHs is configured to transmit uplink data.

The transmitter 1302 is configured to perform multiplexing transmission on UCI and uplink data to be transmitted by the time-domain overlapping channel group, the UCI including the uplink SR.

Figure 14:
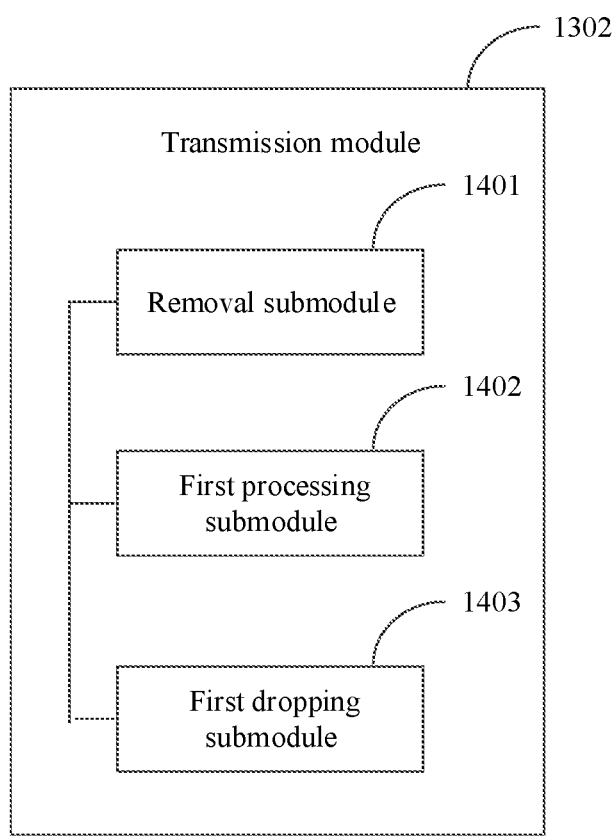
FIG. 14 is a block diagram of a transmitter according to an example.

In one or more embodiments, as shown in FIG. 14, the transmitter 1302 includes a removal submodule 1401, a first processing submodule 1402 and a first dropping submodule 1403.

The removal submodule 1401 is configured to remove the uplink SR from the UCI.

The first processing submodule 1402 is configured to perform channel coding and modulation on the uplink data and other UCI than the uplink SR and map the uplink data and the other UCI than the uplink SR to a time-frequency resource for the PUSCH transmission.

The first dropping submodule 1403 is configured to drop transmission of the group of PUCCHs in the time-domain overlapping channel group.

Figure 15:
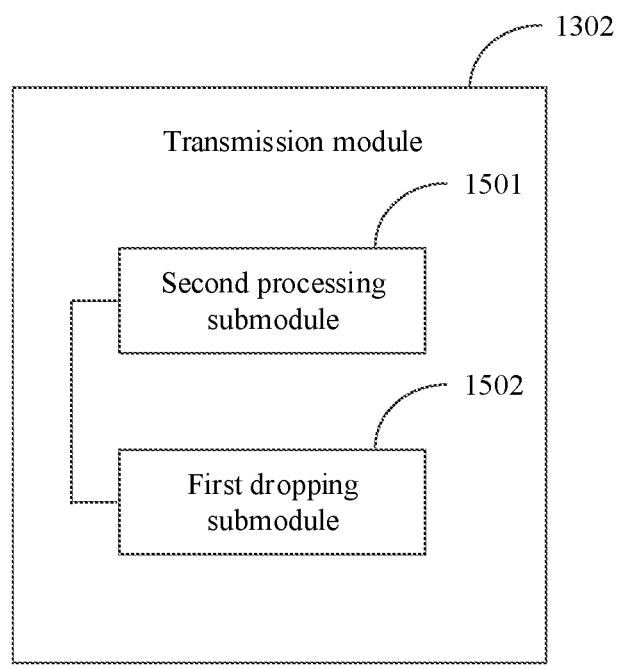
FIG. 15 is a block diagram of a transmitter according to an example.

In one or more embodiments, as shown in FIG. 15, the transmitter 1302 includes a second processing submodule 1501 and the first dropping submodule 1502.

The second processing submodule 1501 is configured to perform channel coding and modulation on the uplink data and all the UCI including the uplink SR and map the uplink data and other UCI than the uplink SR to the time-frequency resource for the PUSCH transmission; and The first dropping submodule 1502 is configured to drop transmission of the group of PUCCHs in the time-domain overlapping channel group.

In one or more embodiments, the second processing submodule 1501 is configured to perform channel coding and modulation on bit information of the uplink SR according to a channel coding and modulation manner for the uplink SR and map a modulation symbol of the modulated uplink SR and the modulated uplink data to the time-frequency resource for the PUSCH transmission.

In one or more embodiments, the second processing submodule 1501 is configured to merge bit information of the uplink SR and bit information of other UCI than the uplink SR, perform independent channel coding and modulation on the merged bit information of the UCI according to a channel coding and modulation manner for the other UCI than the uplink SR and map a modulation symbol of the modulated UCI and the modulated uplink data to the time-frequency resource for the PUSCH transmission.

In one or more embodiments, the second processing submodule 1501 is configured to perform independent channel coding and modulation on the bit information of the uplink SR according to a channel coding and modulation manner for a pre-configured type of other UCI and map the modulation symbol of the modulated uplink SR and the modulated uplink data to the time-frequency resource for the PUSCH transmission.

In one or more embodiments, the other UCI at least includes one of uplink HARQ feedback information and CSI.

Figure 16:
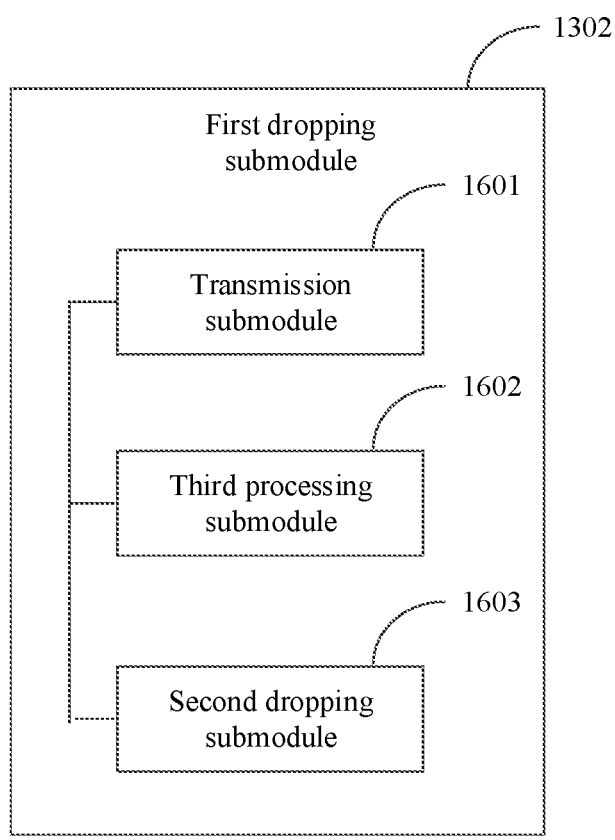
FIG. 16 is a block diagram of a transmitter according to an example.

In one or more embodiments, as shown in FIG. 16, the transmitter 1302 includes a transmission submodule 1601, a third processing submodule 1602 and a second dropping submodule 1603.

The transmission submodule 1601 is configured to transmit the uplink SR through the PUCCH.

The third processing submodule 1602 is configured to perform channel coding and modulation on the uplink data and other UCI than the uplink SR and map the uplink data and the other UCI than the uplink SR to the time-frequency resource for the PUSCH transmission.

The second dropping submodule 1603 is configured to drop transmission of other PUCCHs than the PUCCH transmitting the uplink SR in the time-domain overlapping channel group.

Figure 17:
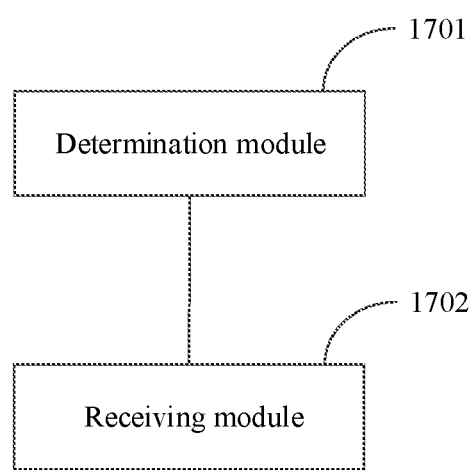
FIG. 17 is a block diagram of an uplink transmission apparatus according to an example.

FIG. 17 is a block diagram of an uplink transmission apparatus according to an example. The apparatus may be implemented into part or all of an electronic device through software, hardware or a combination of the two. Referring to FIG. 17, the uplink transmission apparatus is applicable to a base station and includes a determination module 1701 and a receiver 1702.

The determination module 1701 is configured to determine a time-domain overlapping channel group to be transmitted in a time unit. The time-domain overlapping channel group includes a group of PUCCHs and a group of PUSCHs, the group of PUCCHs and the group of PUSCHs include a PUCCH and a PUSCH that overlap in a time domain, the PUCCH included in the group of PUCCHs is configured to transmit an uplink SR and the PUSCH included in the group of PUSCHs is configured to transmit uplink data.

The receiver 1702 is configured to receive multiplexing transmission of UCI and uplink data to be transmitted by the time-domain overlapping channel group, the UCI including the uplink SR.

Figure 18:
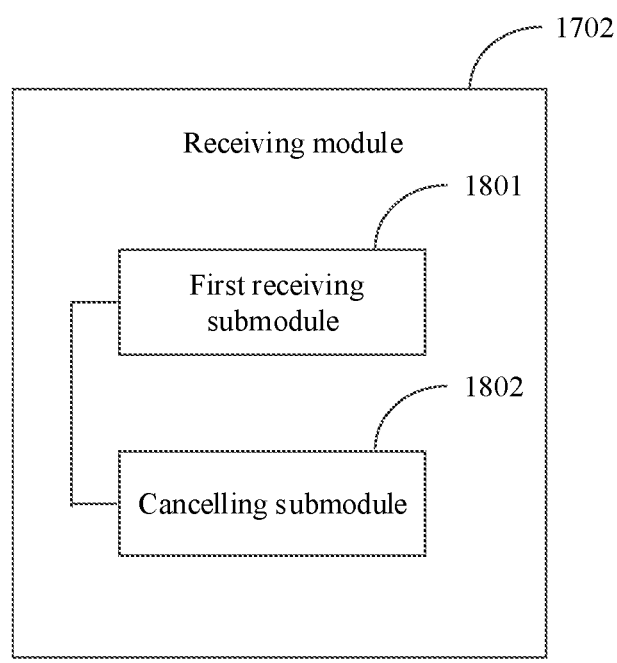
FIG. 18 is a block diagram of a receiver according to an example.

In one or more embodiments, as shown in FIG. 18, the receiver 1702 includes a first receiving submodule 1801 and a cancelling submodule 1802.

The first receiving submodule 1801 is configured to receive a modulation symbol of the uplink data and other UCI than the uplink SR in the PUSCH transmitting the uplink data.

The cancelling submodule 1802 is configured to cancel reception of the uplink SR.

Figure 19A:
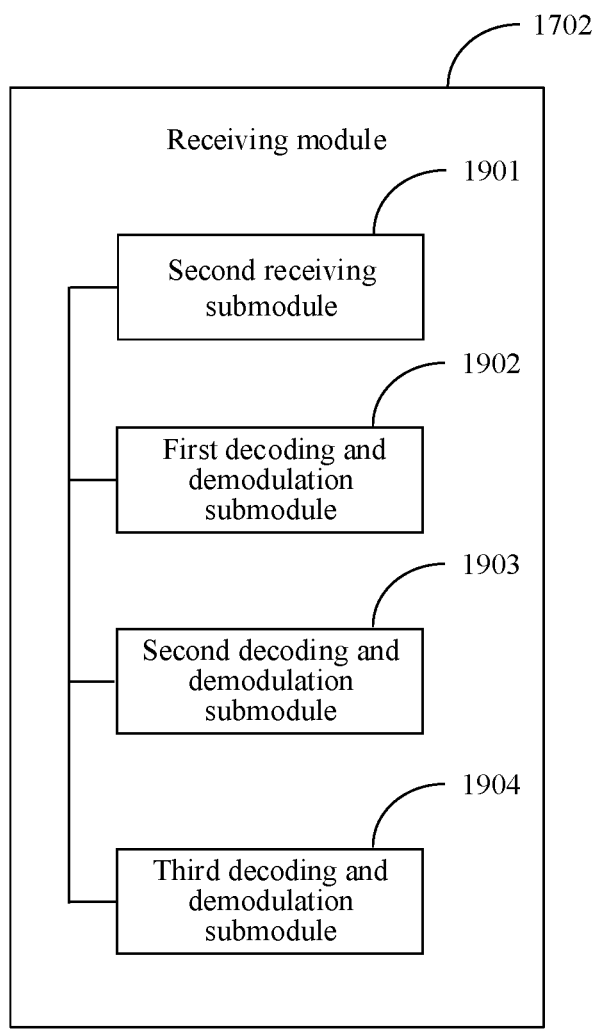
FIG. 19A is a block diagram of a receiver according to an example.
Figure 19B:
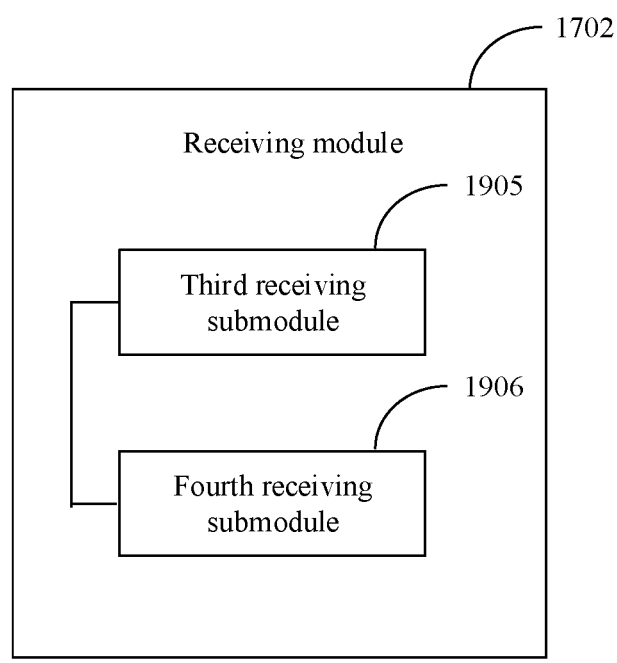
FIG. 19B is a block diagram of a receiver according to an example.

In one or more embodiments, as shown in FIG. 19A, the receiver 1702 includes a second receiving submodule 1901, and further includes a first decoding and demodulation submodule 1902, a second decoding and demodulation submodule 1903 or a third decoding and demodulation submodule 1904.

The second receiving submodule 1901 is configured to receive the UCI including the uplink SR in the PUSCH transmitting the uplink data.

The first decoding and demodulation submodule 1902 is configured to obtain the uplink SR subjected to multiplexing transmission according to a channel decoding and demodulation manner for the uplink SR.

The second decoding and demodulation submodule 1903 is configured to obtain the uplink SR subjected to multiplexing transmission according to a channel decoding and demodulation manner for a pre-configured type of other UCI.

The third decoding and demodulation submodule 1904 is configured to obtain the uplink SR subjected to multiplexing transmission according to a channel decoding and demodulation manner for other UCI than the uplink SR in the PUSCH.

In one or more embodiments, as shown in FIG. 18, the receiver 1702 includes a third receiving submodule 1905 and a fourth receiving submodule 1906.

The third receiving submodule 1905 is configured to receive a modulation symbol of the uplink data and other UCI than the uplink SR in the PUSCH transmitting the uplink data.

The fourth receiving submodule 1906 is configured to receive the uplink SR in the PUCCH transmitting the uplink SR.

With respect to the apparatuses in the above embodiment, the specific manners for performing operations for individual modules therein have been described in detail in the embodiment regarding the method, which will not be elaborated herein.

Figure 20:
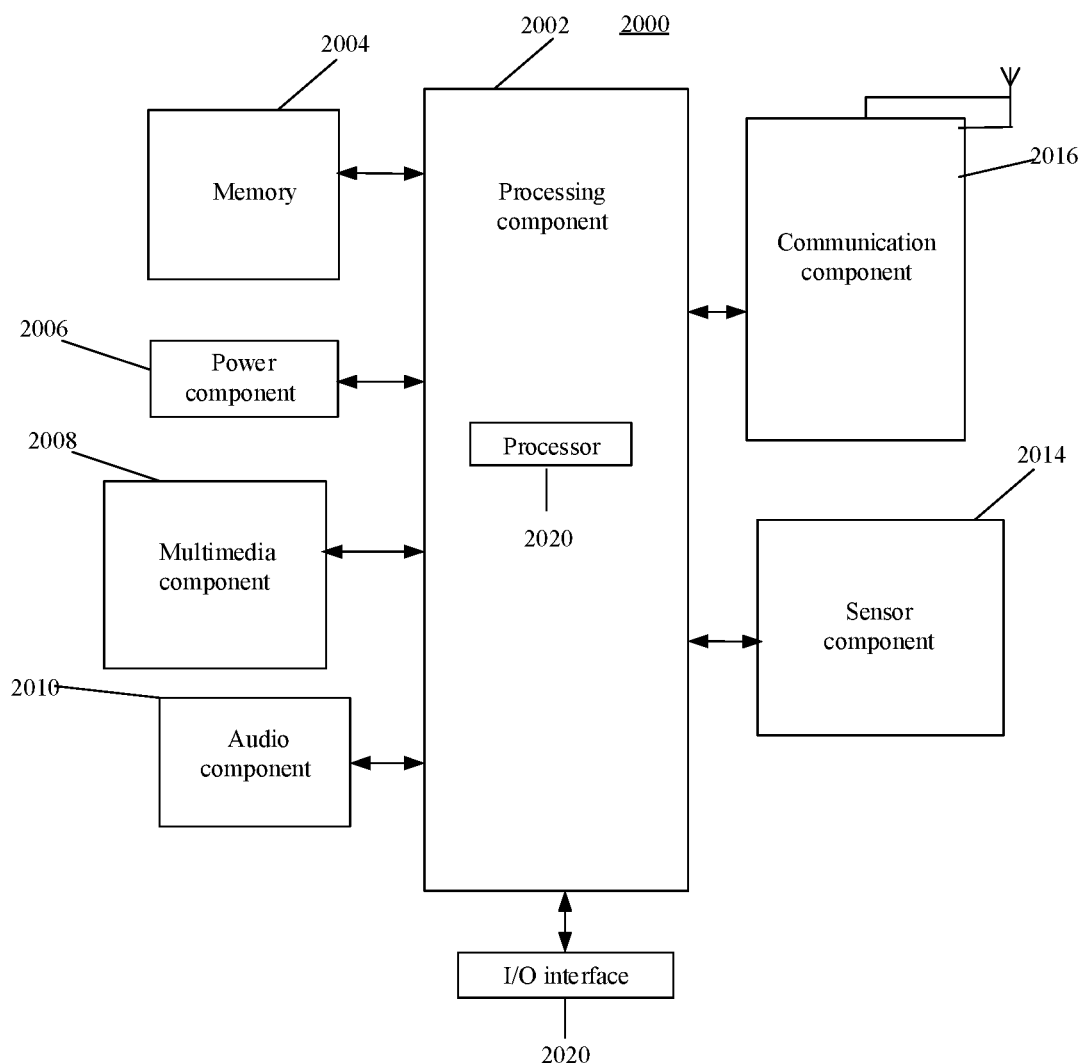
FIG. 20 is a block diagram of an apparatus applicable to uplink transmission according to an example.

FIG. 20 is a block diagram of an apparatus applicable to uplink transmission according to an example. For example, the apparatus 2000 may be a mobile phone, a computer, a digital broadcast terminal, a messaging device, a gaming console, a tablet, a medical device, exercise equipment, a personal digital assistant and the like.

The apparatus 2000 may include one or more of the following components: a processing component 2002, a memory 2004, a power component 2006, a multimedia component 2008, an audio component 2010, an Input/Output (I/O) interface 2020, a sensor component 2014, and a communication component 2016.

The processing component 2002 typically controls overall operations of the apparatus 2000, such as the operations associated with display, telephone calls, data communications, camera operations, and recording operations. The processing component 2002 may include one or more processors 2020 to execute instructions to perform all or part of the operations in the abovementioned method. Moreover, the processing component 2002 may include one or more modules which facilitate interaction between the processing component 2002 and the other components. For instance, the processing component 2002 may include a multimedia module to facilitate interaction between the multimedia component 2008 and the processing component 2002.

The memory 2004 is configured to store various types of data to support the operation of the apparatus 2000. Examples of such data include instructions for any applications or methods operated on the apparatus 2000, contact data, phonebook data, messages, pictures, video, etc. The memory 2004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2006 is configured to provide power for various components of the apparatus 2000. The power component 2006 may include a power management system, one or more power supplies, and other components associated with generation, management and distribution of power for the apparatus 2000.

The multimedia component 2008 includes a screen providing an output interface between the apparatus 2000 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2008 includes a front camera and/or a rear camera. The front camera and/or the rear camera may receive external multimedia data when the apparatus 2000 is in an operation mode, such as a photographing mode or a video mode. Each of the front camera and the rear camera may be a fixed optical lens system or have focusing and optical zooming capabilities.

The audio component 2010 is configured to output and/or input an audio signal. For example, the audio component 2010 includes a Microphone (MIC), and the MIC is configured to receive an external audio signal when the apparatus 2000 is in the operation mode, such as a call mode, a recording mode and a voice recognition mode. The received audio signal may further be stored in the memory 2004 or sent through the communication component 2016. In some embodiments, the audio component 2010 further includes a speaker configured to output the audio signal.

The I/O interface 2020 provides an interface between the processing component 2002 and a peripheral interface module, and the peripheral interface module may be a keyboard, a click wheel, a button and the like. The button may include, but not limited to: a home button, a volume button, a starting button and a locking button.

The sensor component 2014 may include one or more sensors configured to provide status assessment in various aspects for the apparatus 2000. For instance, the sensor component 2014 may detect an on/off status of the apparatus 2000 and relative positioning of components, such as a display and small keyboard of the apparatus 2000, and the sensor component 2014 may further detect a change in a position of the apparatus 2000 or a component of the apparatus 2000, presence or absence of contact between the user and the apparatus 2000, orientation or acceleration/deceleration of the apparatus 2000 and a change in temperature of the apparatus 2000. The sensor component 2014 may include a proximity sensor configured to detect presence of an object nearby without any physical contact. The sensor component 2014 may also include a light sensor, such as a Complementary Metal Oxide Semiconductor (CMOS) or Charge Coupled Apparatus (CCD) image sensor, configured for use in an imaging application. In some embodiments, the sensor component 2014 may also include an acceleration sensor, a gyroscope sensor, a magnetic sensor, a pressure sensor or a temperature sensor.

The communication component 2016 is configured to facilitate wired or wireless communication between the apparatus 2000 and another apparatus. The apparatus 2000 may access a communication-standard-based wireless network, such as a Wireless Fidelity (WiFi) network, a 2nd-Generation (2G) or 3rd-Generation (3G) network or a combination thereof. In an example, the communication component 2016 receives a broadcast signal or broadcast associated information from an external broadcast management system through a broadcast channel. In an example, the communication component 2016 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an example, the apparatus 2000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an example, there is also provided a non-transitory computer-readable storage medium storing instructions, such as the memory 2004 storing instructions, and the instructions may be executed by the processor 2020 of the apparatus 2000 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an example, an uplink transmission apparatus is provided, which includes:

a processor; and memory configured to store instructions executable by a processor, wherein the processor is configured to:

determine a time-domain overlapping channel group to be transmitted in a time unit, the time-domain overlapping channel group including a group of PUCCHs and a group of PUSCHs, the group of PUCCHs and the group of PUSCHs including a PUCCH and a PUSCH that overlap in a time domain, the PUCCH included in the group of PUCCHs being configured to transmit an uplink SR and the PUSCH included in the group of PUSCHs being configured to transmit uplink data; and perform multiplexing transmission on UCI and uplink data to be transmitted by the time-domain overlapping channel group, the UCI including the uplink SR.

According to a non-transitory computer-readable storage medium, the instructions in the storage medium is executable by the processor of the apparatus to enable the apparatus to implement the uplink transmission method. The method includes that:

a time-domain overlapping channel group to be transmitted in a time unit is determined, the time-domain overlapping channel group including a group of PUCCHs and a group of PUSCHs, the group of PUCCHs and the group of PUSCHs including a PUCCH and a PUSCH that overlap in a time domain, the PUCCH included in the group of PUCCHs being configured to transmit an uplink SR and the PUSCH included in the group of PUSCHs being configured to transmit uplink data; and multiplexing transmission is performed on UCI and uplink data to be transmitted by the time-domain overlapping channel group, the UCI including the uplink SR.

Figure 21:
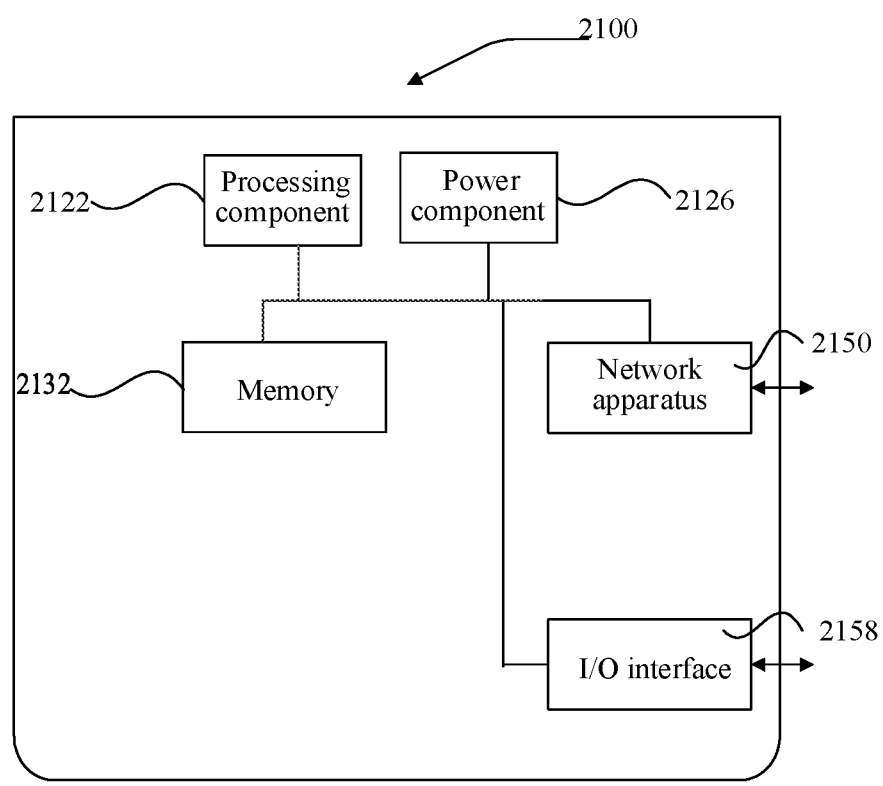
FIG. 21 is a block diagram of an apparatus applicable to uplink transmission according to an example.

FIG. 21 is a block diagram of an apparatus 2100 for data synchronization according to an example. For example, the apparatus 2100 may be provided as a computer. Referring to FIG. 21, the apparatus 2100 includes a processing component 2122, further including one or more processors, and a memory resource represented by memory 2132 storing instructions executable by the processing component 2122, for example, an application program. The application program stored in the memory 2132 may include one or more than one module of which each corresponds to a set of instructions. In addition, the processing component 2122 is configured to execute the instruction to execute the data synchronization method.

The apparatus 2100 may further include a power component 2126 configured to execute power management of the apparatus 2100, a wired or wireless network interface 2150 configured to connect the apparatus 2100 to a network and an I/O interface 2158. The apparatus 2100 may be operated based on an operating system stored in the memory 2132, for example, Windows Server™, Mac OS X™, Unix™, Linux™, FreeBSD™ or the like.

In an example, an uplink transmission apparatus is provided, which includes:

a processor; and memory configured to store instructions executable by the processor, wherein the processor is configured to:

determine a time-domain overlapping channel group to be transmitted in a time unit, the time-domain overlapping channel group including a group of PUCCHs and a group of PUSCHs, the group of PUCCHs and the group of PUSCHs including a PUCCH and a PUSCH that overlap in a time domain, the PUCCH included in the group of PUCCHs being configured to transmit an uplink SR and the PUSCH included in the group of PUSCHs being configured to transmit uplink data; and receive multiplexing transmission of UCI and uplink data to be transmitted by the time-domain overlapping channel group, the UCI including the uplink SR.

According to a non-transitory computer-readable storage medium, the instructions in the storage medium is executable by the processor of the apparatus to enable the apparatus to implement the uplink transmission method. The method includes that:

a time-domain overlapping channel group to be transmitted in a time unit is determined, the time-domain overlapping channel group including a group of PUCCHs and a group of PUSCHs, the group of PUCCHs and the group of PUSCHs including a PUCCH and a PUSCH that overlap in a time domain, the PUCCH included in the group of PUCCHs being configured to transmit an uplink SR and the PUSCH included in the group of PUSCHs being configured to transmit uplink data; and multiplexing transmission of UCI and uplink data to be transmitted by the time-domain overlapping channel group is received, the UCI including the uplink SR.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

According to an aspect of the embodiments of the present disclosure, a method for uplink transmission applicable to User Equipment (UE) is provided, the method includes:

determining overlapping PUCCHs and PUSCH(s) in a time unit, wherein the overlapping PUCCHs comprise at least a PUCCH carrying transmit uplink Scheduling Request (SR) and at least a PUCCH transmitting other Uplink Control Information (UCI) than the SR; and transmitting a PUSCH transmission carrying the multiplexed the other UCI and the PUSCH(s).

In some embodiments, the other UCI may be HARQ-ACK information.

In some embodiments, the other UCI may be Channel State Information (CSI).

In some embodiments, the time unit may be a slot.

In some embodiments, the transmitting the PUSCH transmission carrying the multiplexed the other UCI and the PUSCH(s) may include:

transmitting the PUSCH transmission carrying the multiplexed the other UCI and the PUSCH(s), and not transmitting the SR.

In some embodiments, the method may further include: dropping the PUCCH overlapping with the PUSCH.

According to another aspect of the embodiments of the present disclosure, a method for uplink transmission applicable to base station is provided, the method includes:

receiving, in a time unit, a PUSCH transmission carrying multiplexed PUCCHs and PUSCH(s), wherein the PUSCH transmission, wherein the PUCCHs carrying other UCI than uplink Scheduling Request (SR), and the PUCCHs overlap in time-domain with the PUSCH(s); and canceling reception of a PUCCH carrying the uplink SR, wherein the PUCCH carrying the uplink SR overlaps in time-domain with the PUCCH carrying the other UCI than the SR.

In some embodiments, the other UCI may be HARQ-ACK information.

In some embodiments, the other UCI may be Channel State Information (CSI).

In some embodiments, the time unit may be a slot.

According to yet another aspect of the embodiments of the present disclosure, a User Equipment (UE) is provided, the UE includes:

a processor; and memory configured to store instructions executable by the processor, wherein the processor is configured to:

determine overlapping PUCCHs and PUSCH(s) in a time unit, wherein the overlapping PUCCHs comprise at least a PUCCH carrying transmit uplink Scheduling Request (SR) and at least a PUCCH transmitting other Uplink Control Information (UCI) than the SR; and transmit a PUSCH transmission carrying the multiplexed the other UCI and the PUSCH(s).

In some embodiments, the other UCI may be HARQ-ACK information.

In some embodiments, the other UCI may be Channel State Information (CSI).

In some embodiments, the time unit may be a slot.

In some embodiments, the transmitting the PUSCH transmission carrying the multiplexed the other UCI and the PUSCH(s) may include:

transmitting the PUSCH transmission carrying the multiplexed the other UCI and the PUSCH(s), and not transmitting the SR.

In some embodiments, the processor may be configured to:

drop the PUCCH overlapping with the PUSCH.

According to yet another aspect of the embodiments of the present disclosure, a base station is provided, the base station includes:

a processor; and memory configured to store instructions executable by the processor, wherein the processor is configured to:

receive, in a time unit, a PUSCH transmission carrying multiplexed PUCCHs and PUSCH(s), wherein the PUSCH transmission, wherein the PUCCHs carrying other UCI than uplink Scheduling Request (SR), and the PUCCHs overlap in time-domain with the PUSCH(s); and cancel reception of a PUCCH carrying the uplink SR, wherein the PUCCH carrying the uplink SR overlaps in time-domain with the PUCCH carrying the other UCI than the SR.

In some embodiments, the other UCI may be HARQ-ACK information.

In some embodiments, the other UCI may be Channel State Information (CSI).

In some embodiments, the time unit may be a slot.

What is claimed is:

1. A method for uplink transmission, applicable to User Equipment (UE) and comprising:

determining a time-domain overlapping channel group to be transmitted in a time unit, where the time-domain overlapping channel group comprises a group of Physical Uplink Control Channels (PUCCHs) and a group of Physical Uplink Shared Channels (PUSCHs), the group of PUCCHs and the group of PUSCHs comprise a PUCCH and a PUSCH that overlap in time-domain, the group of PUCCHs comprises a PUCCH configured to transmit an uplink Scheduling Request (SR), the group of PUSCHs comprises a PUSCH configured to transmit uplink data; and performing multiplexing transmission on Uplink Control Information (UCI) and uplink data to be transmitted by the time-domain overlapping channel group, wherein the UCI comprises the uplink SR, wherein the PUCCH configured to transmit the uplink SR is overlapped with a PUCCH configured to transmit a Hybrid Automatic Repeat reQuest (HARQ); and the PUCCH configured to transmit the HARQ is overlapped with the PUSCH configured to transmit the uplink data, wherein the performing multiplexing transmission on the UCI and the uplink data to be transmitted by the time-domain overlapping channel group comprises:

removing the uplink SR from the UCI;

performing channel coding and modulation on the uplink data and other UCI than the uplink SR, and mapping the uplink data and the other UCI to a time-frequency resource for the PUSCH transmission; and dropping transmission of the PUCCH comprised in the time-domain overlapping channel group.

2. The method of claim 1, wherein the PUCCH configured to transmit the uplink SR is not overlapped with any PUSCH in the group of PUSCHs.

3. A method for uplink transmission, applicable to a base station and comprising:

determining a time-domain overlapping channel group to be transmitted in a time unit, wherein the time-domain overlapping channel group comprises a group of Physical Uplink Control Channels (PUCCHs) and a group of Physical Uplink Shared Channels (PUSCHs), the group of PUCCHs and the group of PUSCHs comprise a PUCCH and a PUSCH that overlap in time-domain, the group of PUCCHs comprises a PUCCH configured to transmit an uplink Scheduling Request (SR), and the group of PUSCHs comprises a PUSCH configured to transmit uplink data; and receiving multiplexing transmission of Uplink Control Information (UCI) and uplink data to be transmitted by the time-domain overlapping channel group, wherein the UCI comprises the uplink SR, wherein the PUCCH configured to transmit the uplink SR is overlapped with a PUCCH configured to transmit a Hybrid Automatic Repeat reQuest (HARQ); and the PUCCH configured to transmit the HARQ is overlapped with the PUSCH configured to transmit the uplink data, wherein receiving multiplexing transmission of the UCI and the uplink data to be transmitted by the time-domain overlapping channel group comprises:

receiving a modulation symbol of the uplink data and other UCI than the uplink SR in the PUSCH transmitting the uplink data; and cancelling reception of the uplink SR.

4. The method of claim 3, wherein the PUCCH configured to transmit the uplink SR is not overlapped with any PUSCH in the group of PUSCHs.

5. An apparatus for uplink transmission, comprising:
a processor; and
memory configured to store instructions executable by the processor,
wherein the processor is configured to:
determine a time-domain overlapping channel group to be transmitted in a time unit, where the time-domain overlapping channel group comprises a group of Physical Uplink Control Channels (PUCCHs) and a group of Physical Uplink Shared Channels (PUSCHs), the group of PUCCHs and the group of PUSCHs comprise a PUCCH and a PUSCH that overlap in time domain, the group of PUCCHs comprises a PUCCH configured to transmit an uplink Scheduling Request (SR), and the group of PUSCHs comprises a PUSCH configured to transmit uplink data; and instruct the apparatus to perform multiplexing transmission on Uplink Control Information (UCI) and uplink data to be transmitted by the time-domain overlapping channel group, the UCI comprising the uplink SR, the PUCCH configured to transmit the uplink SR is overlapped with a PUCCH configured to transmit a Hybrid Automatic Repeat reQuest, (HARQ); and the PUCCH configured to transmit the HARQ is overlapped with the PUSCH configured to transmit the uplink data, wherein the processor is further configured to:
remove the uplink SR from the UCI;
perform channel coding and modulation on the uplink data and other UCI than the uplink SR, and map the uplink data and the other UCI to a time-frequency resource for the PUSCH transmission; and
drop transmission of the PUCCH comprised in the time-domain overlapping channel group.

6. The apparatus of claim 5, wherein the PUCCH configured to transmit the uplink SR is not overlapped with any PUSCH in the group of PUSCHs.

* * * * *